(12) United States Patent
Valerino, Sr.

(10) Patent No.: US 6,173,212 B1
(45) Date of Patent: Jan. 9, 2001

(54) AUTOACCEPTERTUBE DELIVERY SYSTEM

(76) Inventor: Fred M. Valerino, Sr., 327 Gailridge Rd., Timonium, MD (US) 21093

( * ) Notice: Under 35 U.S.C. 154(b), the term of this patent shall be extended for 0 days.

(21) Appl. No.: 09/128,592

(22) Filed: Aug. 3, 1998

Related U.S. Application Data

(63) Continuation-in-part of application No. 08/632,020, filed on Apr. 15, 1996, now abandoned, and a continuation-in-part of application No. 08/513,569, filed on Aug. 10, 1995, now Pat. No. 5,805,454.

(51) Int. Cl.$^7$ ..................................................... B65B 57/00
(52) U.S. Cl. ........................................... 700/218; 700/222
(58) Field of Search ..................... 364/478.01–478.04, 364/478.06–478.08, 478.1, 478.13–478.18; 406/3, 4, 10, 34, 37, 184, 197–198; 198/339.1, 341.01, 341.03, 343.1; 700/213, 215, 218, 222, 214, 220

(56) References Cited

U.S. PATENT DOCUMENTS 4,820,086 * 4/1989 Kieronski ............................. 406/112
4,958,716 * 9/1990 Matsuo et al. ..................... 198/346.1
5,805,454 * 9/1998 Valerino, Sr. et al. ......... 369/478.03

* cited by examiner

Primary Examiner—M. Kemper
(74) Attorney, Agent, or Firm—Ward & Olivo

(57) ABSTRACT

The present invention relates to a method and apparatus for the automatic receipt and distribution of products, such as parenteral products from a hospital pharmacy or specimen from a laboratory, through a pneumatic tube transport system. The system of the present invention includes a method and apparatus for the automatic receipt of a pneumatic tube carrier, the automatic opening of the carrier, the loading of a product into the carrier, the automatic closing of the carrier, and the automatic distribution of the carrier into a pneumatic tube transport system.

4 Claims, 21 Drawing Sheets

PPAS FUNCTIONAL BLOCK DIAGRAM

PPAS PRODUCT PREPARATION

PPAS - PRODUCT INSPECTION

INSPECTORS INTERFACE CONSOLE

PROVIDES INTF BETWEEN PRODUCT PRODUCTION & TRANSPORT SYSTEM (NOT NECESSARY FOR SYSTEM NOT NEEDING MANUAL INSPECTION)

PHARMACY DISTRIBUTION SYSTEMS A

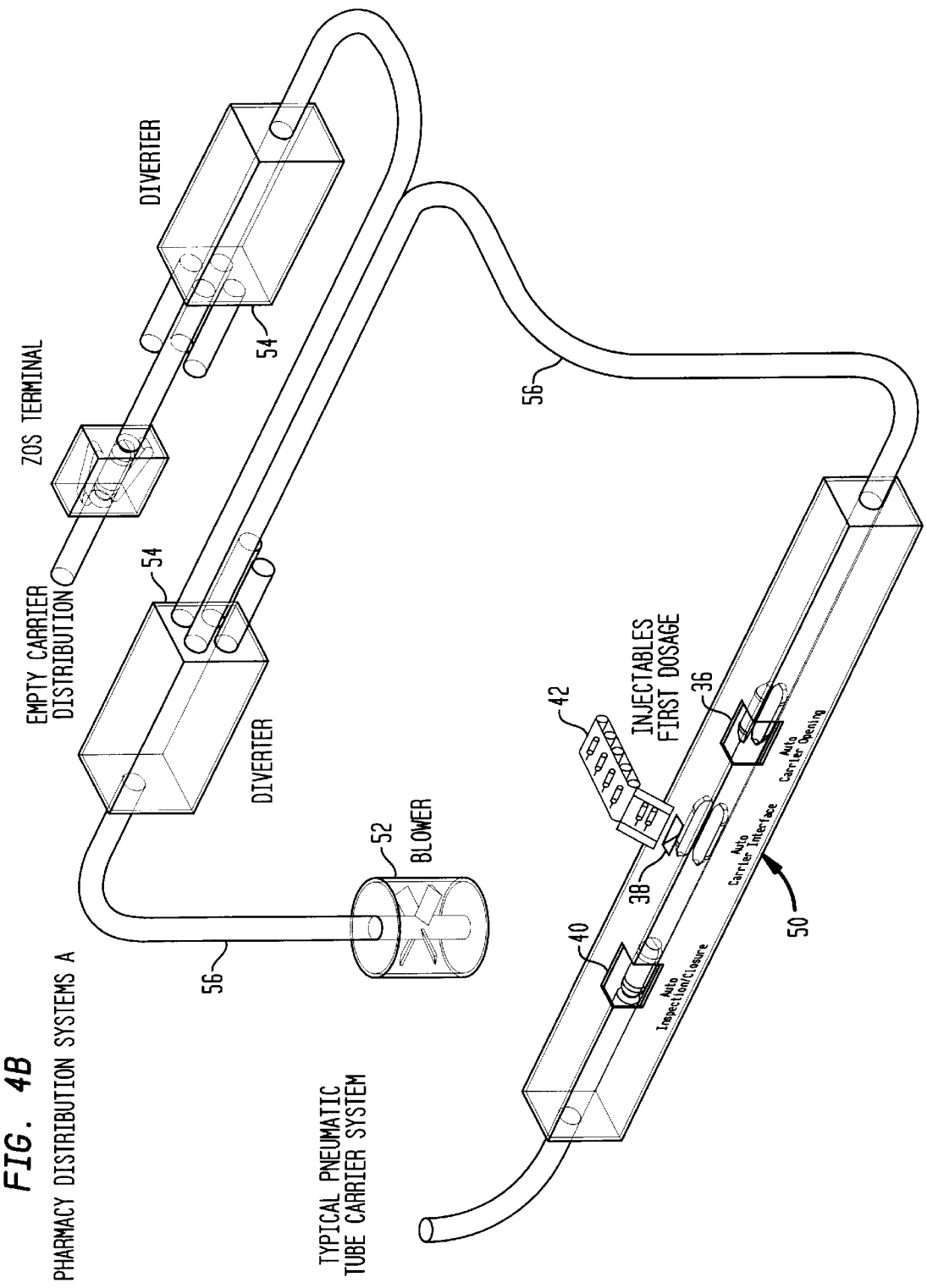

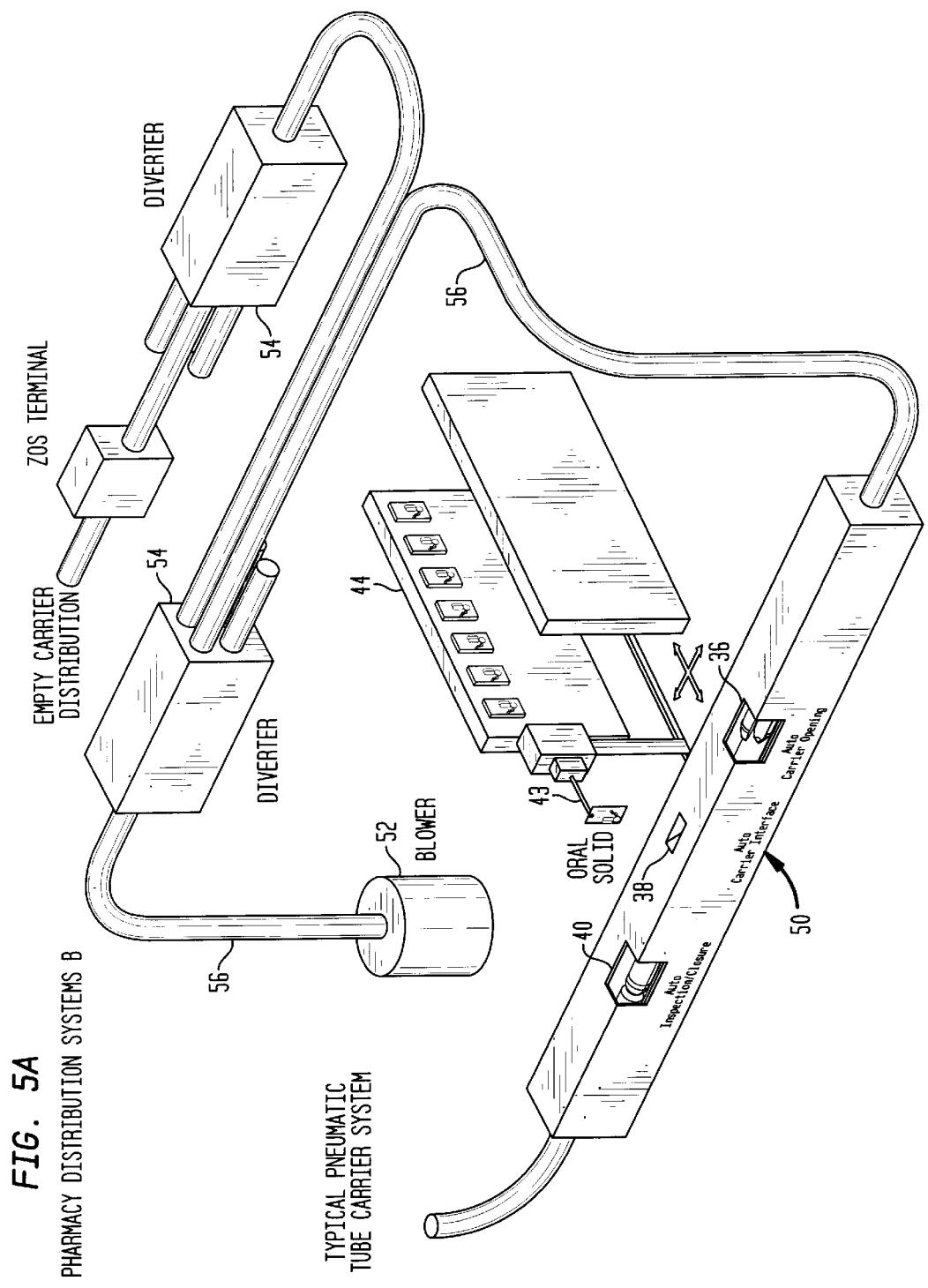

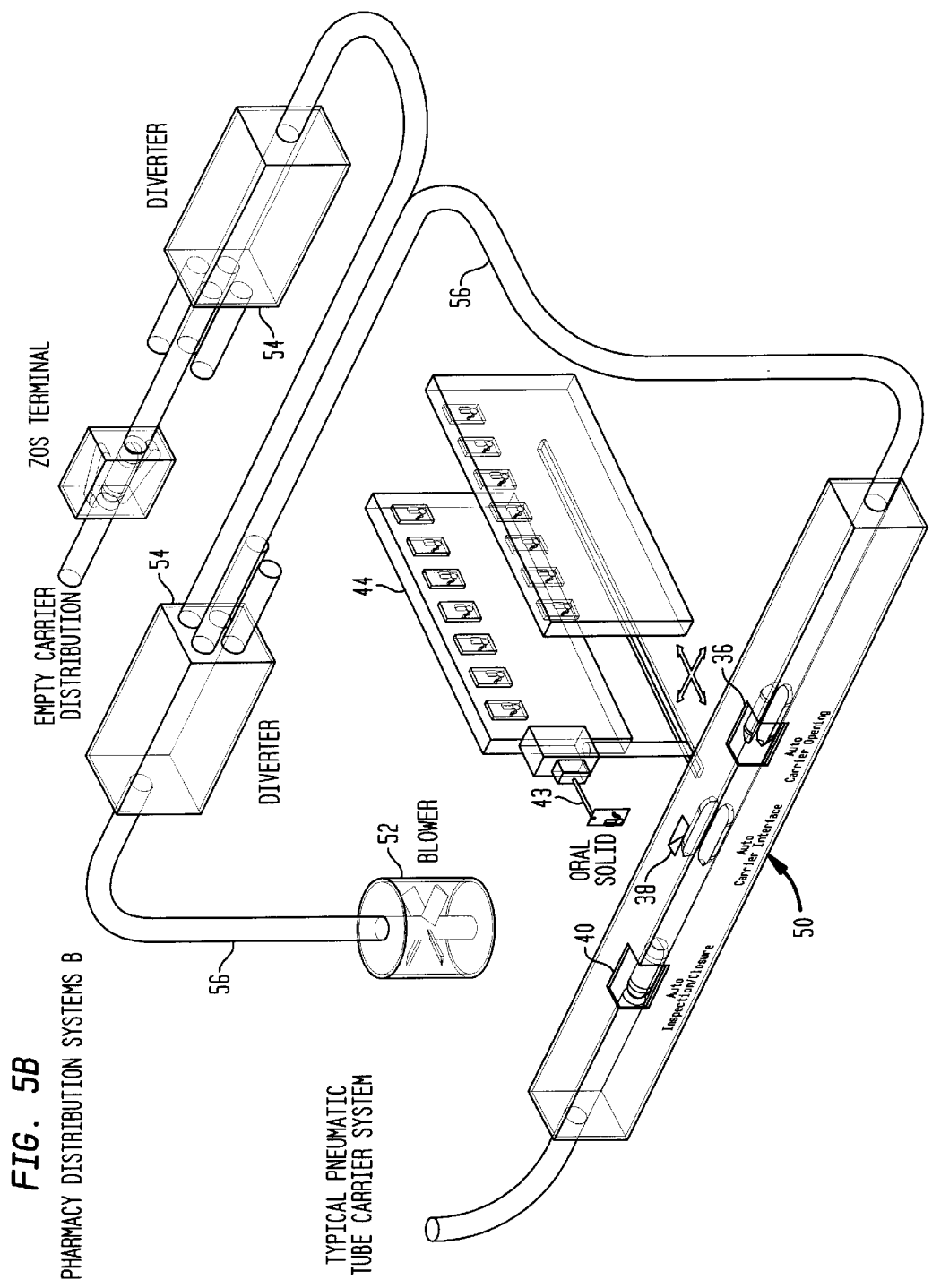

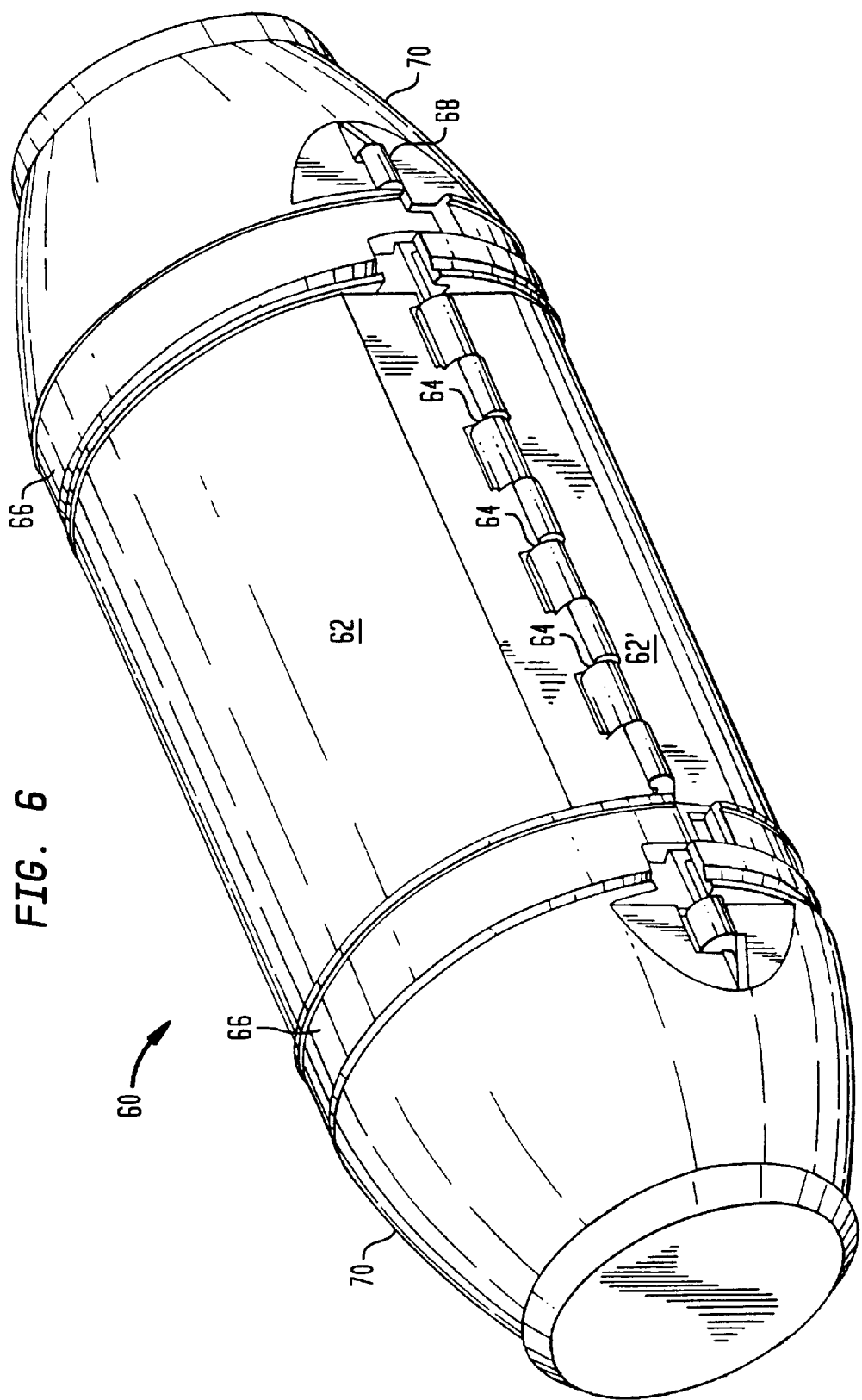

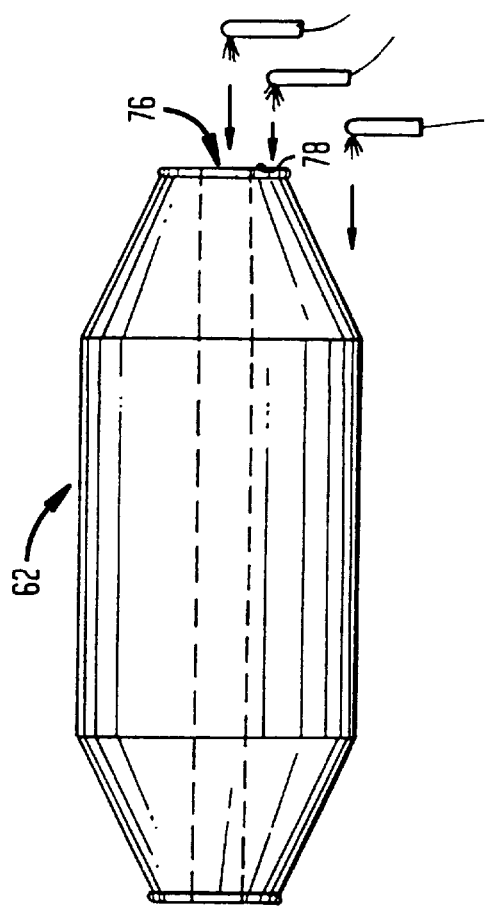
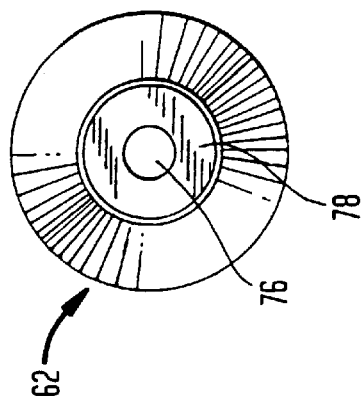
FIG. 6B
FIG. 6A

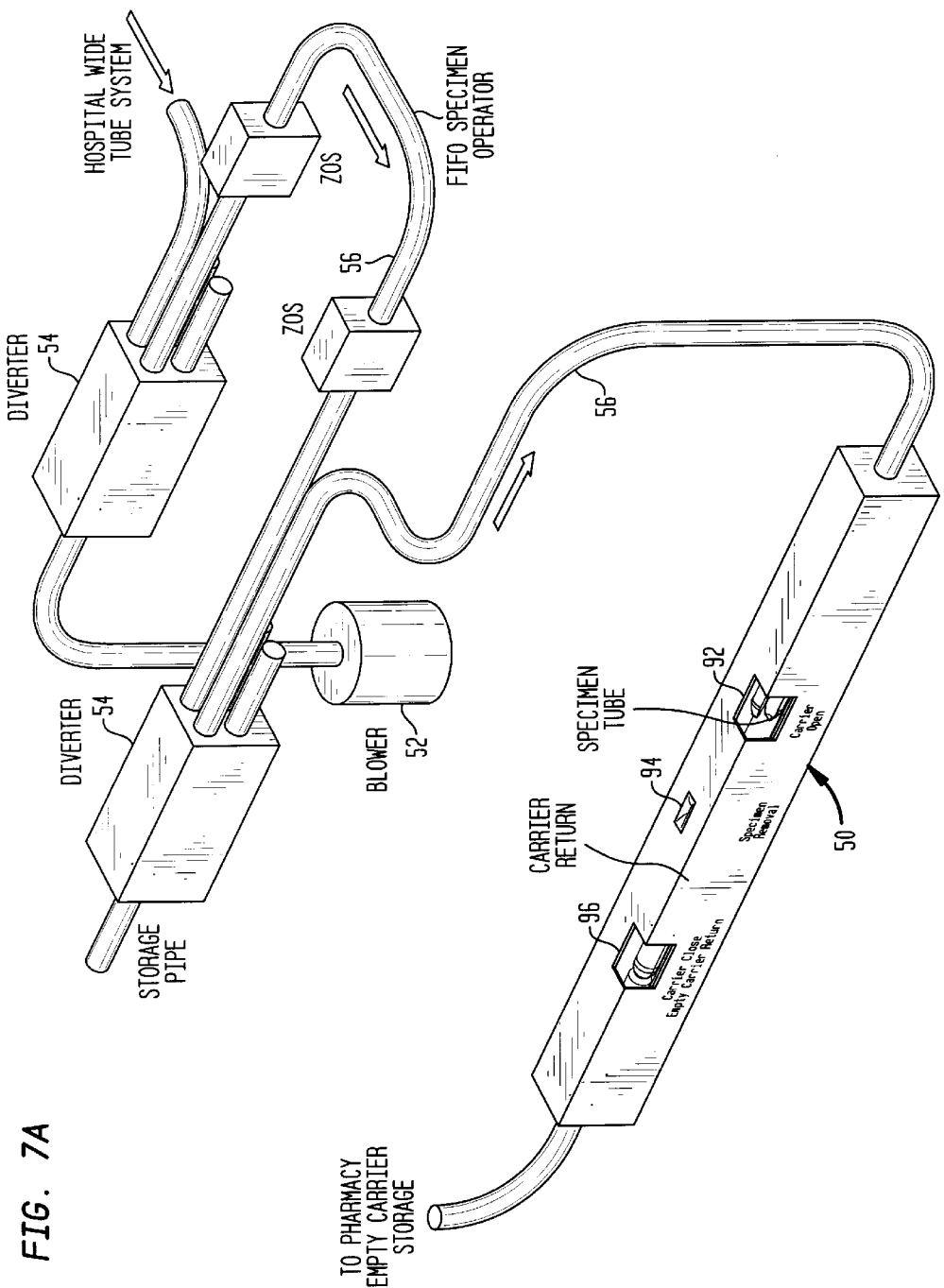

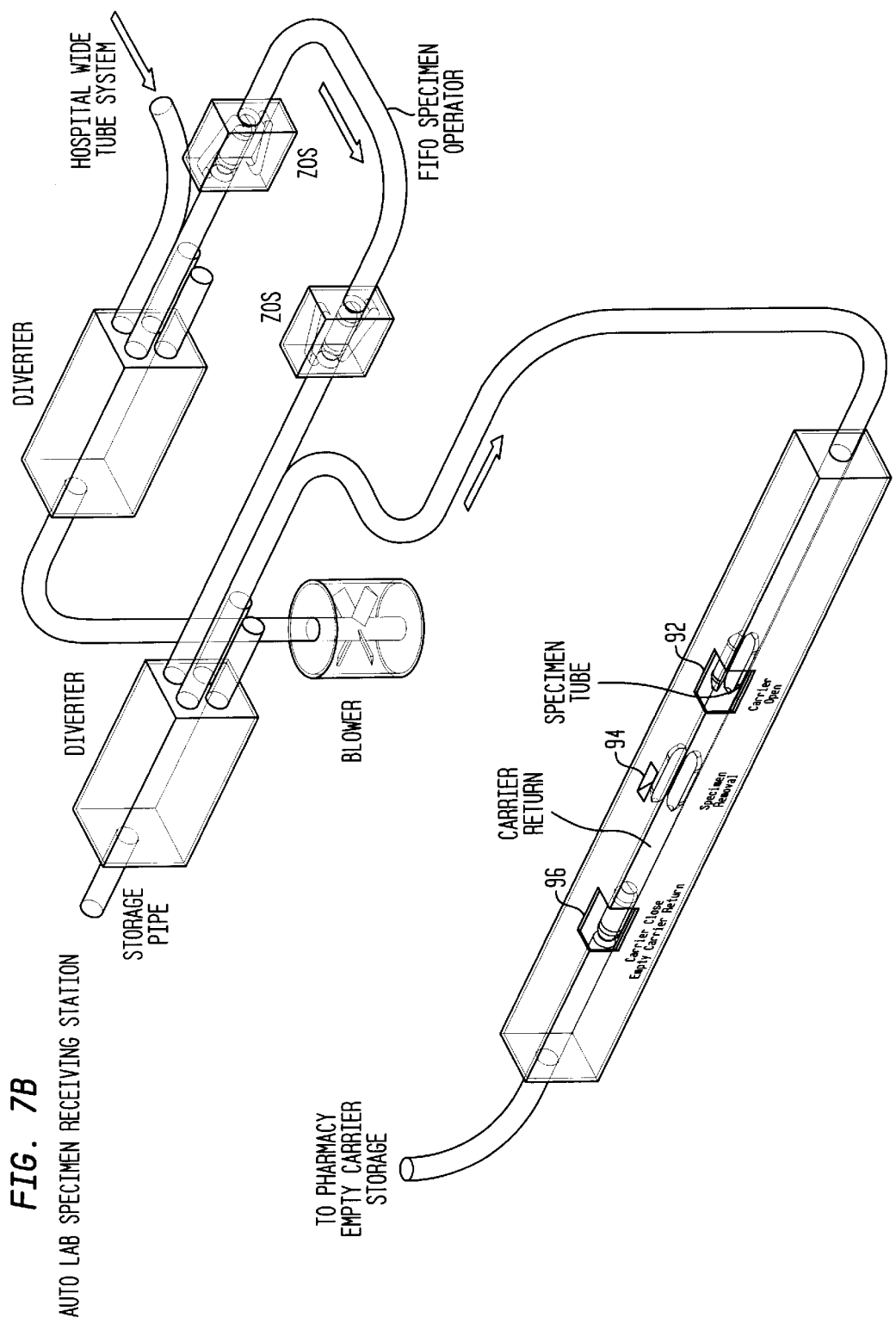

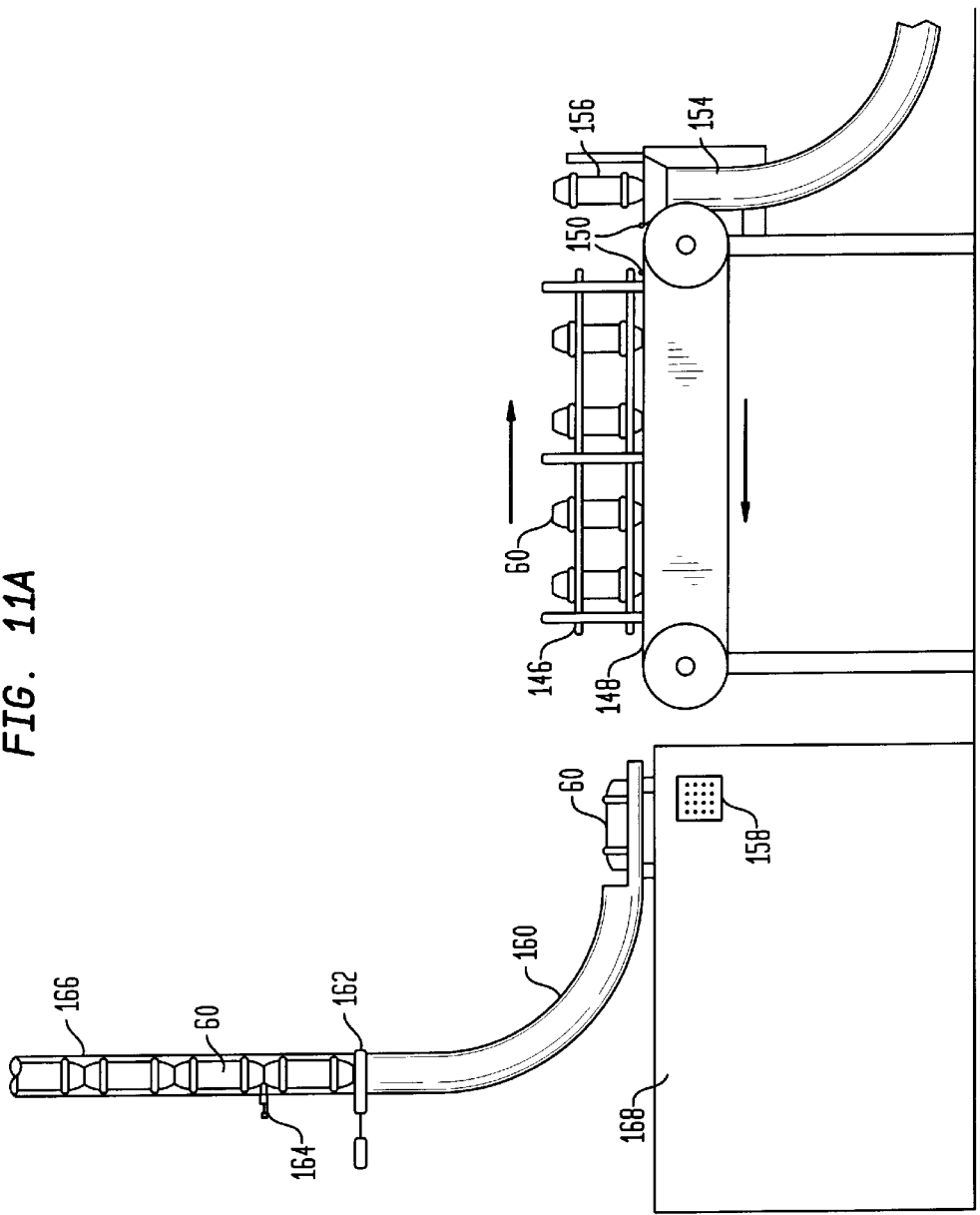

AUTOACCEPTERTUBE DELIVERY SYSTEM

CROSS-REFERENCE TO RELATED APPLICATIONS

This application is a continuation-in-part application of application Ser. No. 08/632,020, filed on Apr. 15, 1996, now abandoned which is a continuation-in-part application of application Ser. No. 08/513,569, filed on Aug. 10, 1995 now U.S. Pat. No. 5,805,454.

TECHNICAL FIELD OF THE INVENTION

The present invention relates to an automated system for the distribution and retrieval of products, such as parenteral products from a hospital pharmacy, to any number of remote locations, for example a variety of predetermined stations within the hospital, such as nurses' stations and patients' rooms. The system of the present invention is described in combination with the four-step process disclosed in co-pending application Ser. No. 08/513,569. The transportation step described therein comprises a pneumatic tube system in conjunction the automatic distribution and receiving system of the present invention. More particularly, the present invention represents an enhancement of previously disclosed systems, wherein, preferably, a fully automated pneumatic tube distribution and receiving system is used in conjunction with robotic selection, reconstitution, and dispensing apparatus for preparing and transporting materials accurately and efficiently without need of human intervention.

BACKGROUND OF THE INVENTION

In many hospitals large numbers of doses of parenteral products have to be prepared daily, for example intravenous bags and other medications administered intravenously. These doses are usually prepared manually in what is an exacting but tedious responsibility for a highly skilled staff. It is, therefore, an object of this invention to provide an automated dispenser to simplify the manual operations necessary for preparing doses of parenteral products while maintaining the exacting standards set by medical regulatory bodies.

Further, prompt and reliable delivery of parenteral products to the patient is essential to the daily operations of a hospital. Manual delivery can be slow and unreliable, possibly resulting in harm to patients. Pneumatic tube transportation systems are currently used to transfer blood samples, medicines, intravenous bags, viral samples or other biological or chemical matter between locations within a hospital or laboratory quickly and reliably. Thus, it is an object of this invention to combine an automated pneumatic tube system with a robot device apparatus to provide a complete automated system for the efficient processing and delivery of parenteral products within a hospital. Other uses of the present invention include dietary, laboratory, and central supply systems, as well as to prepare and deliver intravenous bags.

Dramatic improvements in industrial productivity and quality have been achieved with the application of robotic technology. Spinoffs of this technology that will impact everyday life include home robots for housecleaning, lawnmowing and fast food robots. Against this backdrop, hospitals and hospital laboratories across the country are beginning to consider the benefits of robotic automation. Health care traditionally has been a difficult marketplace for automation because of the complexity of the procedures and the potential health risks. Nevertheless, exciting medical applications such as the use of robots as assistants in surgical procedures have recently been described. Robots will have a significant impact on medical care by eliminating mundane chores, reducing the exposure of personnel to AIDS and other infectious diseases, and lowering labor costs.

In confronting increasing pressure to reduce the cost of providing analytical results, many laboratories have centralized their services to conserve resources. By consolidating services, expensive equipment has less idle time and labor is used more cost effectively. However, centralization may adversely affect the sample-to-result turnaround time by increasing the distance of the centralized laboratory from the origin of the specimen. Frequently, analytical results must be obtained in a short time to provide information for rapid assessment of a situation so that corrective actions may be taken. In medical care, for example, the clinical state of a critically ill patient must be assessed and corrected before a life threatening condition occurs. Similarly, in the outpatient clinic, providing results of blood analysis to physicians while the patients are still in the physicians' office is highly desirable because it obviates the need for a return appointment to discuss abnormal laboratory results. In industrial process control, real-time monitoring of the progress of chemical reactions by on-site analytical techniques prevents dangerous conditions or loss of products.

Until now, improvements in the turnaround of results have been obtained either by dedicated rapid specimen transportation systems or by simplifications of analytical techniques that make the specimen analysis faster. Pneumatic tube systems, mobile carts, and robotic messengers have been used with some success to transport specimens rapidly to the central laboratory, or from a central pharmacy to remote stations. The present invention provides a greatly improved delivery system, and is particularly directed to the use of an automated pneumatic tube or other automated system in the distribution and receiving step.

By definition, a robot is any machine that can be programmed to perform any task with human-like skill. Practically, the term robotics refers to programmable devices that can perform a variety of skilled actions by using a combination of mechanical and electronic components. Robots are often considered simply a mechanical extension of the computer. The greatest asset of a robot is that it can be configured to perform a multiplicity of tasks and therefore should wear out before it becomes outmoded. Devices designed for only one repetitive task are referred to as "hard automation," e.g., auto-samplers, pipetters, and all other instrumentation with limited mechanical capabilities or restricted programmability.

Laboratory robots can take many forms, however, three basic configurations of robots are predominately used in the clinical laboratory environment, although many other robots are available that are suitable for the laboratory environment.

Cartesian robots are devices with three linear degrees of freedom. Items can be moved about in a three-dimensional (x,y,z) space, but not rotated. Cartesian robots are the basis for sampling devices in many automated analyzers. However, Cartesian robots have found more versatility in the clinical laboratory as pipetting stations, designed to perform many liquid-handling activities.

An example of a Cartesian robot would be the Biomek pipetting station (Beckman Instruments, Brea, Calif.) where the robot can be programmed to perform various liquid-handling protocols. Cartesian robot-pipetting stations allow placement of a pipette tip at any point in space, within approximately equal to 0.2 mm repeatability, with the capability of aliquoting and diluting specimens and dispensing reagents. Cartesian robot-pipetting stations have as their principal components microprocessor-controlled stepping motors that drive liquid-handling syringes, pipetting arms, and in some units movable sample trays.

The Biomek is a hybrid robot in that it has a series of interchangeable hands that allow it to vary its pipetting capabilities. However, the Biomek cannot mechanically manipulate test tubes. In addition, it comes equipped with a built-in spectrophotometer. The Biomek and other similar pipetting stations can be programmed to perform other useful liquid-handling chores such as washing an antibody-coated bead, or rinsing the wells in a microtiter plate.

Recently the Biomek has been configured to perform a monoclonal solid-phase immunoenzymatic assay for carcinoembryonic antigen (Hybritech Inc., San Diego, Calif.). Because of the Biomek's built-in spectrophotometer, the entire assay, including bead washing and data reduction, is handled automatically.

There are several examples in the clinical laboratory of the use of pipetting stations to perform analytical procedures. Brennan et al demonstrated the use of the Tecan Sampler 505 (Tecan AG, Hombrechtikon, Switzerland) in the screening test for anti. HTLV-III antibodies. The procedure required placing a patient's plasma sample in a rack, after which the pipetting station diluted the plasma 441-fold. A barcode reader and pipette washer were retrofitted to the device to positively identify patients and to eliminate carry-over, respectively. The system operated at approximately the same rate as a trained medical technologist but demonstrated better precision and allowed technologists to perform other tasks.

The cylindrical robot, exemplified by the Zymate robot (Zymark Corp., Boston, Mass.) works in a cylindrical performance envelope. The four degrees of freedom exhibited by cylindrical robots (base rotation, elevation, movement in and out of a plane, and wrist roll) are usually sufficient for most laboratory operations. The major limitation of these robots is the lack of wrist pitch, which would be useful for getting in and out of tight places. Additional flexibility in task performance is obtained by programming the robot to use a series of interchangeable hands (a feature patented by Zymark Inc.). Hand and finger orientation is determined by potentiometric servo motors that allow the robot to "sense" its orientation at all times. This arm is a popular choice for simple repetitive tasks and has been used successfully for many sample-preparation protocols, both in the clinical laboratory and in the pharmaceutical industry.

The use of a cylindrical robotic arm to produce an automated blood-typing system that would be affordable to most laboratories has been investigated. The system consists of an indexing rack for samples, which are identified by a barcode reader. After significant development over several years, the system was described again, with throughput increased from 40 to 104 samples per hour. The device was later commercialized by Microban (Dynatech Laboratories, Chantilly, Va.). The success of robotic applications in the blood bank is due to the production line nature of blood typing. Laboratory services that support blood banks require many repetitive analyses before the blood can be used for transfusion. It has been estimated that, in 1984, 12 million units of whole blood were collected in various medical centers, each unit of which required ABO and Rh typing. The blood-typing process has been automated by some manufacturers, but these units cost greater than $100,000 and so are not accessible to most regional hospitals with small transfusion volumes. Robotic arms not only are less expensive than a dedicated blood-typing instrument but also can be reprogrammed when the laboratory's needs change.

The cylindrical robot has been used in the clinical chemistry laboratory at the Cleveland Clinic Foundation to prepare samples for an HPLC method in a complex series of steps: sample extraction, separation of liquid phases, and injection. These investigators incorporated several Zymate robotic systems into a laboratory for the analysis of antidepressants. Medical technologists were needed to prepare the reagents, to place necessary supplies at the designated locations within reach of the robot, and to evaluate the quality of the final results. The robotic laboratory was placed under a fume hood to eliminate any toxic fumes originating from extracted samples during the evaporation process. The robot completed the drug extractions and made the sample injection into the chromatograph by using a specially designed injection hand. For several years these robots have been performing their repetitive tasks with only minor malfunctions.

The use of a robot to perform preparative immunologic precipitations, with final placement of the samples into a rotor for subsequent analysis has been recently reported. This robotic system, which consisted of a Zymate robot and a Cobas-Bio rotor (Roche Diagnostics, Nutley, N.J.), was the first reported system to combine a clinical analyzer and a laboratory robot. However, placing the rotor in the analyzer and transferring the data to the laboratory computer were performed manually.

The Vancouver General Hospital has automated a highly complex steroid-receptor analysis, using a Zymate robotic system. The estrogen receptor assay ordinarily is a manual procedure, involving many critical steps such as centrifugation, incubation, and subsequent placement of completed samples in scintillation vials. In the automated procedure, the incubation water bath, centrifuge, and supply and reagent stations are placed in a circular pattern around the robotic arm. The reagents, which are particularly labile in this assay, are kept cold in an ice bath. Finished samples are added to scintillation vials by the robotic arm. Because more than one rack of vials is produced in a single uninterrupted robotic procedure, the scintillation vial racks are placed in a tiered holder to allow the robot access to two racks.

A Zymate robot, fitted with exchangeable pipetter hands, has been used to dilute and transfer samples for blood grouping in the blood bank. The robot, configured as a pipetting device, was also used to orient samples for barcode reading. After the robot had performed the liquid handling, a human operator proceeded with additional manual aspects of the test. As discussed earlier, many blood-bank analytical methods are relatively simple and are used in sufficient numbers to warrant a dedicated analyzer.

The most versatile robot available to the clinical laboratory is the articulating robot in that it offers more degrees of freedom than either the Cartesian or the cylindrical robots. The articulating robot has shoulder, elbow, and wrist joints, rotating on a pivoting base. Furthermore, the robot has wrist pitch-and-roll, as well as wrist yaw maneuvers, that allow access to areas often difficult to reach on analytical instruments. Positional accuracy of 0.5 mm or better is obtained by using optically encoded discs that must be set by nesting to a home or zero location each time the robot is turned on. A recent example of a sophisticated articulating robot is from Cyberfluor Inc. (Toronto, Ontario, Canada). The Cyberfluor robot has a high degree of flexibility, with five degrees of freedom. Sample processing is currently the rate-limiting step in most clinical laboratories. Using a robot in conjunction with a clinical centrifuge allows processing of samples as they enter the laboratory. One advantage of an articulating robotic arm is its ability to reach over the rim and into a clinical centrifuge to retrieve samples. For a cylindrical robot to perform this task requires use of a custom-altered centrifuge or a custom-made robotic hand. A novel serial centrifuge has also been developed to separate sera or plasma from formed elements in the blood-collection tube. The single-tube centrifuge will eventually be incorporated into a robotic sample-handling system that should not only speed up laboratory productivity but also reduce risk of exposure to AIDS and hepatitis.

Articulating robots are also beginning to be used in the blood-bank laboratory. One manufacturer of blood-banking automation (Flow Laboratories, McLean, Va.) markets a robot interfaced to various microplate-handling devices (pipetters readers, washers, centrifuges). The entire device (the IROBAL) is enclosed in a protective hood, obviously designed to reduce operator exposure to contaminants.

Establishing control of robot motion to mimic the smooth movement of the human arm with a high degree of repositional precision is a difficult problem addressed by the science of kinematics. Kinematics are applied to the robot in three levels of complexity. First, trajectory planning determines position, velocity, and acceleration for each movement made by the robotic manipulators. Second, inverse kinematics are applied to translate the movements required in the coordinate system into the joint movements required by the particular geometry of the robot being developed. Finally, inverse dynamic equations are applied to establish how the robot moves in response to various applied torques and forces. Each movement of the robot is represented, therefore, by a set of remarkably complex equations, the implementation of which has fortunately been simplified through the use of high-level computer languages.

Robot locomotion is a general term applied to all types of robot movement in which the robot can venture away from a fixed point. Locomotion imparts another degree of freedom to the robot but also allows an increase in the variety of hardware with which a robot can interact. Robots can be made mobile by several methods. Robotic arms can be attached to linear tracks or to a mobile cart. In the case of a mobile cart, the portion of the robot imparts mobility is considered an "Automated Guided or Guidance Vehicle" (AGV). AGVs are either equipped with an automatic onboard guidance system or follow a path on the floor wall or ceiling. Guidance is provided through various sensors, e.g., infrared, video, magnetic, or simple light sensors for reflective tape paths. Equipping AGVs with a robotic component produces a mobile robot. Some robots are being designed to have human- or animal-like gait, so that they may climb stairs, for example. The study of bringing human- or animal-like gait to robotic machines is called bionics.

A recent improvement in robot locomotion is the use of linear tracks. The robotic arms can travel the length of a linear track, either upright or upside down, with positional precision of 0.5 mm. This concept has altered the evolution of laboratory design from circular tables with the fixed robot in the middle, back to the classic laboratory bench stretched along the perimeter of the room. Ergonometric laboratories are now possible, such that either technologists or robots can operate the instruments. Robots that can travel the length of a laboratory bench have performance envelopes (the areas in which the robot can perform useful work) that resemble an elongated hemisphere of a doughnut.

Several attempts at robot locomotion have been tried in the clinical setting. Computer-driven vehicles that move about the hospital corridors picking up specimens and delivering them to the main laboratory have been popularized. Similarly, robotic vehicles that move about the laboratory, returning empty specimen racks to the central specimen-receiving area of the lab have also been designed. Mobile robots that can negotiate the corridors of a hospital for specimen delivery have been investigated by Transitions Research Corp. (TRC, Danbury, Conn.) and Saurer Automation Systems, Inc. (Holland, Mich.). Unlike many mobile robots, the TRC Helpmate does not rely on a guide affixed to the floor. The TRC mobile robot is equipped with infrared, ultrasonic, and vision sensors to acquire information about the environment. With the aid of a preprogrammed knowledge base of the hospital layout, the robot arrives at its destination without colliding with patients or objects in its path. Saurer's AGV follows a fluorescent dye guidepath which may be placed directly onto carpeting.

The mechanical performance of the robot can be enhanced by adding sensor technology on the hands or joints of the robot. Various mechanical and electronic sensor systems may be used, e.g., computerized imaging systems to check for sample integrity and container position for access by a robot. Currently, video systems allow a robot the greatest degree of spatial resolution. Several investigators are looking at the feasibility of tactile sensing in the fingertips of robotic fingers. Tactile sensing approaching that of the human finger is in the foreseeable future.

The advantage of sensor technology is the ability of the robot to respond to changes in the analytical method. With proper sensor technology, closed-loop operation of robots becomes a possibility. Analytical data can be checked by the robot's host computer, which is equipped with an expert system, and corrective measures such as sample re-analysis can be initiated if necessary. Many of these enhancements to increase the intelligence of the robotic system have not been examined in the clinical laboratory setting. However, both the Zymate and Cyberfluor robots have fingers that can sense the presence of absence of objects in their grasp. This feature is helpful if test tubes or syringes are dropped inadvertently during a procedure.

Perhaps the single most important factor that has stimulated the introduction or robotics into the clinical laboratory has been the development of high-level robot programming languages with English language commands. For example, the simple command GOTO MIXER initiates an intricate sequence of steps to drive the robotic arm to the mixing device. Several interfaces away from the user's command, the software generates electronic signals to the robot's motion-control mechanism to coordinate a smooth movement arc that terminates at a precise location near the mixer. Complex algorithms involving robot kinematics translate computer machine-code into signals that control the acceleration after commencing the movement and the deceleration before the robotic arm stops at the mixer. Furthermore, to avoid spilling any liquid, the robotic fingers are held parallel to the work surface throughout the complex series of movements. Elaborate procedures can be developed by combining a series of simple commands, which are programmed and tested individually. The robot can be instructed to pause in a procedure, examine the status of a sensor or instrument, and then proceed through a choice of subsequent programs, depending on the outcome of the test. Programmed intelligence of this sort allows highly adaptive systems for performing many assays.

The integration of the various levels of programing language and the input and output ports of the robotic system are controlled by a high-level robot language. Future robotics software is being directed toward standardization and modularization of the basic operations performed in the clinical laboratory: sample manipulation, liquid handling, separation, conditioning, weighing, measuring, reporting, and storing by use of a modular approach. High-level robotic control languages will reduce the time necessary for assay automation. Intellibotics (Oxnard, Calif.) has used a computer graphics interface to simplify writing robot programs. The programs can be implemented graphically before being used to actually run the robot. Modular programming will allow rapid integration of several basic operation modules into a complete assay procedure with appropriate instrumental status checks. Standardization of interfaces with peripheral hardware (i.e., centrifuge, mixer, and pipetter) will be essential for the rapid incorporation of various sample manipulations in the development of robotically controlled assays.

The term user interface implies a software design that makes many of the complex codes for robotic motion control and data input/output transparent to the user. One should be able to use simple English language commands to train a robot to perform any task within its mechanical performance envelope. Perkin-Elmer Corp., Zymark, and Cyberfluor, Inc. have developed simple-to-use robotic-control languages accessible to most computer programmers. Unfortunately, no robot vendor has simplified all aspects of robotics software. In particular the programing associated with communication with other devices remains incomplete.

The use of digitized images (e.g., a picture of the robot and peripheral equipment on the touch screen computer monitor) should allow the user to point to destinations in the picture to which the robot will then physically move. Graphic image inter-faces should reduce the time needed to train laboratory technologists to implement new procedures. Training a laboratory robot to move to specific coordinates on the robotic work-surface can be effected through either a teaching pendant (a group of switches on a remote control) or directly through the robotic keyboard. The robot is positioned by the trainer to a certain location and then the coordinate is entered into the computer via a switch or press of a key on the keyboard. A second coordinate may then be entered in a similar manner. Using simple commands from the keyboard, one replays the coordinates and the robot will move as instructed. Because robots are inherently blind and without tactile senses, they will collide with any obstacles in the path between the two points. Thus trainers must include a third point in the robot program that will allow a collision-free trajectory. A recent innovation in robotic training is the "limp model" used by the CRS robot marketed by Cyberfluor. In this mode a robot trainer can simply grasp the robot arm and move it to a location. A press of a button automatically enters the position into the robot software, where it will be repeated once the software routine is started. Some future prospects for robot training may couple hand movements with digitized images of the work surface. The monitor will display a picture of the robotic laboratory from a choice of perspectives (e.g., top or side view). A trainer then moves his or her hands on the computer monitor in the path the robot will take during the execution of a procedure. Imaginative methods to train robots will simplify and accelerate the programming of new procedures. Efficient robotic laboratories use procedures that are reduced to LUOs (laboratory unit operations); these are used repeatedly or recombined in a different order as laboratory procedures change. Creating new procedures is simplified by the modular design of the robotic laboratory. The most basic LUOs encompass the moving of items around the laboratory bench, or manipulation. A subcategory of this LUO is robotic interaction with a matrix. Many designers of robotic software have simplified the steps necessary to define and interact with a matrix, such as a test-tube rack, because retrieving samples is universal to almost all procedures. To be successful, implementation of laboratory robotics requires careful planning, attention to detail, and specialized training of staff and skilled support personnel.

According to the invention there is provided an automated system comprising processing, inspection, and transportation stations for the preparation and delivery of parenteral products to a plurality of stations within a hospital. The system comprises several methods which are currently in the market place. The automated processing of pharmaceutical products via robot devices is not new. Presently employed are robot devices having gripping means presentable to a plurality of stations, each station being adapted to cooperate with the robot device in a sequence of operations such as to produce a measured pharmaceutical dose from a supply of a pharmaceutically acceptable substances, and one of the stations comprising means for locating in parallel a plurality of medical hypodermic syringes for containing a said substance and for operating said syringe. The substance might comprise a medication to be administered to a patient, or a potentially biologically damaging substance, such as a radionuclide or a cytotoxin. The measured dose might be retained in a said syringe, or in a medical vial. Preferably, means are provided for controlling the apparatus in a predetermined sequence of operations.

Sterility is an essential characteristic of injectable and ophthalmic pharmaceutical products. This characteristic is imparted to the product by virtue of the type of manufacturing process. If during the process, all components, solutions and equipment are pre-sterilized and assembled aseptically, that is, using techniques which exclude microorganisms, the product is deemed an "aseptic fill". Other injectable products, in addition to the aseptic processing, undergo sterilization when in the final container, typically using steam under pressure. This procedure, if properly designed and executed, results in a terminally sterilized product.

One solution to the problems incurred through human contamination is through automation of the processing procedure. A paper entitled, "A Robotics System for the Sterility Testing of Injectables," Barbara J. Zlotnick and Michael L. Franklin, Pharmaceutical Technology, May 1987, describes a robotics system for sterility testing of vials. According to this paper a robot is used to perform sterility testing and minimize the manipulations performed by the analyst, thereby reducing the potential for technical contamination attributable to personnel. Since human intervention is minimized during testing, the environment of the test remains cleaner with respect to viable particulate matter. There is a lower level of human activity and less potential for contamination from shedding or from disruption of the laminarity of the air flow under the hood. A cleaner environment can then be used for a greater proportion of the work day.

In general, robotics dispensing devices known in the art include a dispensing apparatus comprising a base, and a robot device on the base. A number of stations are located on the base which cooperate with the robot device in a sequence of operations such as to produce a measured pharmaceutical dose from a supply of pharmaceutically acceptable substances. Robotics dispensing apparatus systems are used for the rapid and efficient processing of a wide variety of pharmaceutical products, as well as perform various mechanical functions. Further, use of the robot device provides an efficient manner in which to maintain a sterile environment to produce the pharmaceutical products.

The transporting of articles via pneumatic tubes is old and well known. Basically, an object is placed within a container which is then transported by air under either positive or negative pressure from one destination to another. The transport is moved within a closed tube. The interior of the closed tube and the outer dimension of the carrier form a seal, so that the carrier can be propelled between the destinations by a vacuum. Pneumatic tube systems known in the art include a closed continuous passageway having a predetermined inner cross-sectional dimension where the passageway includes a plurality of curves or bends having a predetermined radius. A fluid, such as air, is controllably forced through the passageway in a loop to move a carrier through the passageway. In order for the carrier to move freely through the passageway, the dimensions, and in particular the length, of the carriers being used have been limited by the inner cross-sectional dimension and curvature radius of the passageway.

Pneumatic delivery systems are used extensively for the rapid and efficient transportation of a wide variety of articles. These delivery systems are used in a number of business operations, including banks, hospitals, office buildings, industrial plants, and truck terminals as a few examples.

One area of commerce which currently uses the pneumatic tube and the transporting of material via the pneumatic tube on a fairly regular basis is the hospital or biomedical research/manufacturing industry. One particular application of this technology is in the area of transporting blood samples, medicines, intravenous bags, viral samples or other biological or chemical matter between locations within a hospital or laboratory. In that environment, for example, test tubes or vials of liquids are placed within a tube carrier, and are typically secured by foam or clamps within the carrier. The purpose of securing the samples (which are often contained within glass test tubes with rubber stoppers) is to help prevent breakage. When glass breaks or stoppers become dislodged (as can happen when hospital workers fail to properly secure the stoppers in the first place), chemical or biological substances can leak into the interior of the carrier. In turn, said substances can leak out of the interior of the carrier, thereby contaminating the interior walls of the tube system.

The vials or vessels of liquids, solids or gases within the carrier can move or shift during transport, which can also lead to breakage. This problem is especially acute, as the carriers are often traveling at speeds in excess of 25 feet per second. Because of the rapid acceleration and deceleration of pneumatic tube carriers, the carrier contents can easily become dislodged, and can break within the carrier, if not for clamps, foam securing means, and the like. Nonetheless, accidents can happen, whereby despite the best efforts toward securing or protecting the interior vessels, they can break, or their stoppers can become dislodged. In fact, dislodged stoppers are a primary problem, due mainly to workers who may inadvertently fail to secure them properly.

Carriers for use in the present automated pneumatic tube system come in a wide range of sizes and shapes to accommodate the physical articles to be transported in the system. As an example, pneumatic carriers are provided for transporting cash, messages, stock transaction slips, letters, blueprints, electronic data processing cards, x-rays, pharmaceutical supplies, blood samples, narcotics, viral and bacteria cultures, and a variety of other small physical objects.

Various mechanisms have previously been utilized as closure devices for pneumatic tube carriers. For example, many such carriers include an end cap that is hinged with respect to a cylindrical hull on one side of the hull and which has a latch that fastens the end cap to the opposite side of the hull in a closed position. Such carriers employ a variety of fasteners, such as snap fasteners, elastic straps with holes that fit over hooks, or straps that may be secured to bendable posts.

Side opening pneumatic tube carriers are also well-known. One conventional form of such a carrier employs two generally semi-cylindrical sections that are hinged along one longitudinal edge. The hinged sections may be swung toward or away from each other to effectuate opening and closing of the carrier hull. Locking is achieved by virtue of the end caps, which may be twisted to effectuate threaded engagement of the caps onto the carrier hull ends when the hinged hull sections have been closed. That is, the end caps are rotated in such a fashion as to be drawn towards each other onto the ends of the hull, thereby immobilizing the hull sections relative to each other. Rotation of the end caps in the opposite direction releases the hull sections and allows them to be opened.

A particularly preferred configuration comprises a side opening carrier, wherein the two sides are hinged together, and the two sides are held together when the carrier is closed by use of a hook, or detent or indented type locking lip. Such carriers include latching mechanisms to prevent the door from coming ajar or opening during transit, which could cause the carrier to become lodged in the pneumatic tubes and would also allow the contents of the carrier to spill out into the tube system. In addition, the instructions for latching such side opening containers or carriers are simple to follow, so that the container can be easily placed within the tube system. Such hinging and locking mechanisms make waterproofing or sealing the carrier a particularly difficult task, as the hinges and locks are embedded within the mold of the carrier, which is generally formed of plastic.

In another type of side opening pneumatic carrier, the access to the carrier is gained by simultaneously pulling and twisting the ends of the carrier to allow the side opening door to be opened. The instructions for such a two-step process are often difficult for many users to follow, and the physical effort and manual dexterity needed to simultaneously pull and twist both ends of the carrier against a spring resistance is often troublesome for many hospital workers. The pneumatic carrier is preferably easily opened and have a supplemental sensor mechanism to indicate that abnormal interior conditions have developed.

SUMMARY OF THE INVENTION

The present invention relates to a fully automated system for the distribution and retrieval (through an automated pneumatic tube system) of pharmaceutical products to any of a variety of predetermined locations within a hospital, such as nurses' stations. As an alternative, the invention could be made to deliver the parenteral products directly to the patient's room.

The system of the present invention will be further described for use with a four-step product preparation and transportation system including the automatic product distribution and receiving stations of the present invention. The four-step process comprises an input queue, a dispensing apparatus comprising a robot device and a plurality of stations from which the robot device works, an inspection station, and a transportation system comprising a pneumatic tube system and automatic distribution and receiving stations. A computer interface provides bi-directional communication between analytical instruments, robots, and peripheral devices and a computer. The robot employed by the system is responsive to computer commands and capable of performing mechanical functions including selection and retrieval of the necessary item (i.e., drug vial, syringe, etc.) and manipulation of retrieved items such that the desired product is prepared. The automatic product distribution station comprising three stages: a barcode application and automatic carrier opening stage; carrier docking stage for product placement into carrier; and a barcode verification, destination confirmation and automatic carrier closing stage. Similarly, the receiving station(s) comprise(s) three stages: an automatic carrier opening stage; carrier docking stage for product removal from carrier; and an automatic carrier closing stage.

The system described will receive its instructions from an interface established between the Parenteral Products Automation System ("PPAS") described in co-pending Ser. No. 08/513,569 and the Pharmacy Information System present at the facility where the invention is in place. These instructions are communicated to the processing station comprising a robotics device and a plurality of work stations. The robotics device, utilizing weigh stations for quality control, retrieves a drug dosage vial, reconstitutes the powdered drug dosage of the drug, agitates it to effect a complete dissolving of the product in the added diluent, affixes a syringe tip-cap to the diluted product, and labels the final prepared product. The product is transported via a conveyor belt to an inspection station where all of the products are inspected to assure an accurately prepared product. Possible inspection method include manual inspection, gas chromatography, specific gravity testing, and/or barcode scanning. From the inspection station, via conveyor belt, the product enters a staging area for the pneumatic tube system, which determines the appropriate station to send the product based upon information provided on the label affixed to the syringe. There it is automatically loaded into a carrier, which is assigned a discreet identifier, inserted into the appropriate tube, and routed to the correct location. When the carrier is removed from the receiving station the production cycle is ended.

The PPAS control system database is capable of being searched to determine the status of any single parenteral product being prepared. The overall throughput of the system should be approximately 50 units per hour, with no more than 1 hour of downtime required per day for maintenance, supply replenishment, cleaning, etc.

Step one involves the inputs to the PPAS from the transfer of a file which is prepared within the Pharmacy Information System used in the facility being automated. Based on the patient information in the Pharmacy Information System, a computer automatically sends requests to the PPAS for the preparation and delivery of the proper parenteral product to the appropriate location at the time it is to be administered to the patient. These files are commonly used within the Pharmacy Information System to batch production requirements into a grouping of parenteral products required for a precise period of time. This time period can usually be defined by the facility and can be varied to meet its needs. The contents of this file might include the following database elements which may be used by PPAS:

1. Name, strength, and diluent of drug;
2. Name of patient for whom the product is intended;
3. Room number location of patient;
4. Label instructions and notes; and
5. Time the product is due for administration.

Barcodes could be used to provide any of the above mentioned information upon scanning, thus, enabling the control system database to be searched to determine the status of any product at any time during its preparation and transportation. Further, the system could allow for manual requests, input at any of a plurality of computer terminals within the hospital.

Step two of the invention comprises the product preparation which involves a series of manipulations performed by the robotics arm or arms resulting in the preparation of a single intravenous product unit based on the information provided in step one. The robotics arm or arms should be situated such that it can access any of the plurality of stations from which it performs the product preparation. The series of manipulations are as follows:

The drug specified is retrieved by a robotics arm from a gravity feed rack which was hand-fed prior to the initiation of the automated preparation. A sensor should be placed at the end of each column of drug storage to detect an empty rack and thus notify the operation system that the column needs to be replenished. As an alternative, inventory control software could manage the number of units present in the supply rack or column.

Upon retrieval of the correct drug vial by the robotics arm, the protective cap is removed by inserting the vial into a jig and snapping off the protective cap. The exposed rubber stopper of the vial is swabbed on an alcohol impregnated cotton pledget station. The pledget remains moist with isopropyl alcohol due to a wicking action. Prior to start up of the system, the alcohol container must be filled.

After cleaning the stopper with alcohol, the robotics arm is to set the vial down and retrieve from a syringe rack a standard syringe with a needle attached. The arm then removes the protective needle cover by sticking the cap in a jig and pulling straight up. This action exposes the needle, and the protective cap is discarded.

Next the robotics arm moves to another station and inserts the needle into the injection port of a bag of Sterile Water for Injection which is held inverted, and must be changed with every 100 units prepared. The system must notify the operator to change this unit at the appropriate time. For example, inventory control software could keep track of the units prepared. After insertion of the needle, the plunger on the syringe is extracted drawing water into the syringe.

The syringe and needle containing the water is extracted from the Sterile Water for Injection bag. The regular needle is discarded in a Sharps Waste Container at another station and a vented needle is retrieved from a rack and placed on the end of the syringe. The robotics arm returns to the drug vial where it inserts the syringe into the selected vial of drug. The plunger of the syringe is depressed, expelling the Sterile Water for Injection into the drug vial. Once completely emptied, the syringe and vented needle are removed, and the vial and diluent are placed on an agitation table for 60 seconds.

At this point the system should be able to start on the next drug while waiting for the current drug to complete the agitation step. This is important to maintain the productivity of the unit at a high level of output. Also, the agitation table can be divided into four zones, with each zone being designated within the operating system.

Upon completion of agitation, the robotics arm removes the drug vial from its zone of the agitation table and places it upon a compounding counter. The arm then retrieves the appropriate syringe with vented needle, and inserts the needle into the vial of the drug in solution. The complete, attached system of drug vial, syringe and needle is inverted with the syringe pointing upward. The plunger is retracted, thereby withdrawing the entire contents of the drug vial back into the syringe. The syringe and vented needle are removed from the empty drug vial, and the empty vial is placed in a transport bin, which is gravity fed to a staging location adjacent to a conveyor belt.

The robotics arm removes the vented needle from the syringe. This needle is placed in a Sharps Waste Container. The syringe is inverted and a syringe tip cap is placed on its end. The reconstituted drug within the syringe is then labeled by rolling it over the labeling unit.

The syringe containing the reconstituted and labeled drug is then weighed to assure that the unit meets anticipated specifications for weight, assuring that all diluent was added and all of the drug extracted into the syringe. If accepted, the drug is placed in the same transport bin as the empty drug vial, and the transport bin is slid onto the conveyor belt which transporting the product to the inspection station.

In use of the dispenser, (e.g. for obtaining a dose of Technetium 99 m), syringes, needles, needle caps, vials, etc. are stored on racks with sensors to detect empty racks.

If dose dilution is required, saline solution may be withdrawn from an appropriate vial by use of the syringe, and then inserted into a required vial.

It will be understood that if desired the assembly may be modified to accept two, or more syringes, and may be operated in an alternative manner from that described above. For instance, the above described manipulations performed by the robot arm may alternatively be performed individually at each work station while a means is provided to move the product from one station to the next.

Step three represents the manual or automatic inspection procedure incorporated into this invention. It sits midway between the preparation station and the transportation station. In one method, the resultant drug product will be visually inspected for particular matter, proper labeling, and matching of the drug vial to the stated contents on the label. If everything is in order, the product will be initialed by the inspecting pharmacist, and placed back on the conveyor for transportation to the transportation system. The transport bin will be returned to the rack feeding the robotics arm, and the empty drug vial will be discarded.

In an alternate method, the resultant drug product will be automatically inspected. For this, a few alternatives are available: barcode scanning; specific gravity reading; and gas chromatography. Barcode scanning represents an automated method not unlike the manual inspection (i.e., reading and comparing the labels of the vial and product). Reading the specific gravity of the product allows the system to determine the constitution of the product, with which the system can determine whether it is correct or incorrect. Gas chromatography produces similar results as the specific gravity reading through detecting the prior contents of the empty vial and detecting the constitution of the syringe product.

Step four of the present invention relates to a computerized pneumatic tube transport system consisting of distribution and receiving stations, diverters, a blower package and a computer, all connected via single transmission tubing. It is an object of this invention to provide a traditional pneumatic system in conjunction with the automated preparation step to provide a completely automated pharmaceutical preparation and delivery system within a hospital. The conventional pneumatic tube systems are designed to accommodate carriers of conventional design with a length limited by the predetermined curvature radius of the passageways.

The automated pneumatic tube system could be divided into a four zone system with each zone having its own inbound and outbound tubes. Within each zone are a plurality of receiving stations which are all connected via a series of diverters. The diverters also connect the various zones, allowing inter-zone transportation.

The product is transported from the inspection station to the distribution station via conveyor belt or robotic arm. At stage one of the distribution station, the carrier is presented in a closed position where photo eyes verify that the carrier is the appropriate style carrier, that the carrier has an insert, and that the carrier insert is empty. If verified, the carrier is automatically opened. The conveyor then moves the carrier to stage two where the product is inserted into the empty carrier. Next, the carrier is moved to stage three where it is then closed and ready for delivery to the pneumatic tube transport system.

If in stage one the carrier is rejected, the carrier is not opened and is sent to a designated location for inspection, repair, and/or discard. The next carrier is then moved into place in stage one, ready to be checked by the photo eyes. This continues until a useful carrier is detected. Alternatively, the system could notify the control system of the reject status of the carrier. Also, the carriers could be numbered or otherwise labeled to avoid confusion and to simplify correction of problematic carriers.

Once the carrier is ready for delivery (i.e., the product is loaded into the carrier and the carrier closed), the loaded carrier is then sent to into the pneumatic tube transport system where a series of diverters present in the system allow the carrier to be delivered anywhere the system is designed to go. The series of diverters present in the system also allow inter-zone communication, thus allowing the pneumatic tube system to be used for station to station delivery.

Automatic receiving stations according to the present invention also comprise three stages: an automatic carrier opening stage; carrier docking stage for product removal from carrier; and an automatic carrier closing stage. These stations can be used in many applications, for example, automatically receiving lab specimens, automatically removing prepared parenteral products thereby eliminating any problems with sterility, etc.

Additionally, products and/or carriers may be marked in any of a number of ways and identified by any of a number of methods well-known in industry such as barcodes, CCD cameras, magnetic or other markings, etc. In this manner the present system may be maintained in its fully automated state, thereby eliminating the previously discussed problems associated with human interaction.

A carrier for use with the present invention may include two semi-cylindrical mating, elongated members. The two semi-cylindrical members include means for securing the members to each other to provide a closed elongated compartment, each of the members having an outer cross-sectional dimension which is smaller than the inner cross-sectional dimension of the passageway so that the elongated compartment can pass through the curves of the pneumatic system without engaging the inner surface of the passageway, and each of the members further including means for engaging the inner surface of the passageway to accelerate and stabilize the compartment within the passageway, the surface-engaging means having an outer cross-sectional dimension which is generally equal to the predetermined inner cross-sectional dimension of the passageway. A supplemental ring can be installed around the circumference of the carrier (that is, the two semi-cylindrical in their mated, closed position), to provide an enhanced pressure barrier, to help the carrier move throughout the tube system.

The exterior surfaces of the carrier may include one or more accelerator rings formed on the perimeter of both members. The accelerator rings have an outer cross-sectional dimension which allows it to engage the inner surface of the passageway to provide stability to the carrier and allow the carrier to be moved in response to the controlled air pressure within the passageway. Each of the accelerator rings has a small width in relationship to the overall length of the closed elongated compartment, and each is located in proximity to the ends of the first and second members.

The carrier should also be relatively easy to open and be incapable of insertion into the pneumatic tube delivery system in the partially opened condition. The pneumatic carrier will typically be constructed of plastic, and will contain means to secure articles within the carrier during travel. For example, if, as in the present invention, the carrier is used to transport biomedical or chemical materials, many of which could be dangerous, the carrier will contain either, preferably, a series of clips to retain syringes, or alternatively, a formed foam rubber insert, that can be slotted, egg crate shaped, formed with slits or other cavities in any shape or size, including being formed with holes which mate with syringes, circular openings, and so on, so that the materials contained within the carrier are secured to minimize breakage. In addition, the pneumatic carrier is designed to prevent opening of the carrier once it is in transit in the pneumatic tube delivery system. A securing means should be incorporated for that purpose.

Also, the carrier should include means for securing the shells in the closed position. A raised area on the external face of each of the internal closure pieces, and an indented area is formed in the internal face of the external closure pieces, such that the raised and reciprocal indented areas are aligned for engaging one another and securing the shells of the carrier in the closed position. A detent or indented lock or clip is used to secure the two halves of the carrier together.

Alternatively, the carrier could comprise two semi-cylindrical elongated members mated together, an opening at each end of the carrier, and an insert to secure the product in place. The openings allow for insertion of the product into the carrier without requiring removal of the carrier from the carousel.

A sensor (e.g., an electronic computer controlled sensor) may be included within the cavity formed between the two halves of the carrier. That sensor is capable of ascertaining the release of any materials from within the vessel(s) contained within the carrier. For example, the sensor could detect liquids or gasses that should not normally be present within the carrier. In accordance therewith, the sensor can activate a lock or warning light or signal, that alerts the carrier handler that something has been released within the water/air tight carrier, and that special care must be taken before opening the carrier. Alternatively, the control system could direct the defective carrier to a predetermined "safe" location.

While functionally equivalent to conventional steel, aluminum or cardboard carriers in most respects, plastic has the unique characteristic in that it has a certain "memory" for its original shape. That is, if twisted, struck or otherwise subjected to abuse, the plastic of the carrier of the present invention will tend to return to its original shape. In contrast, metal or cardboard carriers, when subjected to heavy use, are frequently permanently bent or distorted, thus detracting from their geometric symmetry and reducing their useful lives. Conventional carriers which are deformed in this way do not maintain a good air seal in the pneumatic line nearly as well as does the present invention. Also, conventional carriers which have been bent or distorted frequently open in the carrier line during use, thus necessitating the closure of the pneumatic tube system as aforesaid.

Numerous criteria are used in designing a carrier for pneumatic systems. It is preferable that the carrier be light, inexpensive and foolproof. Also, the carrier should be arranged so that it cannot be entered into a tube system when in an open position or open while in the tube. Such an arrangement ensures that the carrier is closed before it is entered into the system thereby limiting the possibilities that the carrier contents will be lost in the system and that the carrier will become lodged in the system. The carrier should preferably also be capable of carrying a maximum length of materials around given bends in the system and be capable of being locked in a closed position. A pair of ring seals (referred to also as accelerator, glide or travel rings, etc.) should be provided intermediate the ends of the carrier for guiding the carrier through a pneumatic tube system and for limiting air seepage past the carrier. End portions of the carrier should be tapered to terminate in bumpers and a pair of latches are coupled to the shells for retaining the carrier in a closed position. A lock should be provided for combining with the closed shells to prevent unauthorized opening of the carrier.

Although the present invention as described relates to an automated system for use in hospitals to supply parenteral products, it is not limited to such a use. Other expressions of its use include dietary, laboratory and central supply systems. Also, it may be used in the preparation and transportation of intravenous bags.

It will be appreciated that although the above description is limited to a one directional process (i.e. from product preparation to product delivery to patient), it is obvious that the invention can also operate in the reverse. That is, a prepared product or sample can be sent from any receiving station of the pneumatic tube system back to the hospital pharmacy, or to any other location within the hospital.

BRIEF DESCRIPTION OF THE DRAWINGS

A further understanding of the present invention can be obtained by reference to a preferred embodiment set forth in the illustrations of the accompanying drawing. Although the illustrated embodiment is merely exemplary of systems for carrying out the present invention, both the organization and method of operation of the invention, in general, together with further objectives and advantages thereof, may be more easily understood by reference to the drawings and the following description. The drawing is not intended to limit the scope of this invention, which is set forth with particularity in the claims as appended or as subsequently amended, but merely to clarify and exemplify the invention.

For a more complete understanding of the present invention, reference is now made to the following drawings in which

FIG. 4B shows a transparent view of the automatic distribution system of FIG. 4A;

FIG. 5A shows a perspective diagrammatic representation of an automatic distribution system for oral/solid products;

FIG. 5B shows a transparent view of the automatic distribution system of FIG. 5A;

FIG. 6 shows an overall view of a carrier suitable for use with the present invention;

FIG. 6A shows a cross-section of both the end and side views of a preferable carrier for this invention;

FIG. 7A shows a perspective diagrammatic representation of an automated specimen receiving station;

FIG. 7B shows a transparent view of the automated specimen receiving station of FIG. 7A;

FIG. 11A shows a side view of a diagrammatic representation of an alternate embodiment of the automatic dispatching apparatus (i.e., down-send carrier dispatch) according to the present invention.

DETAILED DESCRIPTION OF THE PREFERRED EMBODIMENT

As required, a detailed illustrative embodiment of the present invention is disclosed herein. The present invention relates to a fully automated system for the distribution and retrieval (through an automated pneumatic tube system) of pharmaceutical products to any of a variety of predetermined locations. More specifically, the present invention discloses automatic product distribution and receiving stations. As stated above, the invention will be described in for use with a four-step process for the automatic preparation and transportation of pharmaceutical products comprising an input queue, a dispensing apparatus comprising a robot device and a plurality of stations from which the robot device works, an inspection station, and transportation step. This transportation step includes a pneumatic tube transport system and the automatic distribution and receiving stations of the present invention. Additionally, a computer interface provides bi-directional communication between the computer and analytical instruments, robots, and peripheral devices.

Figure 1:
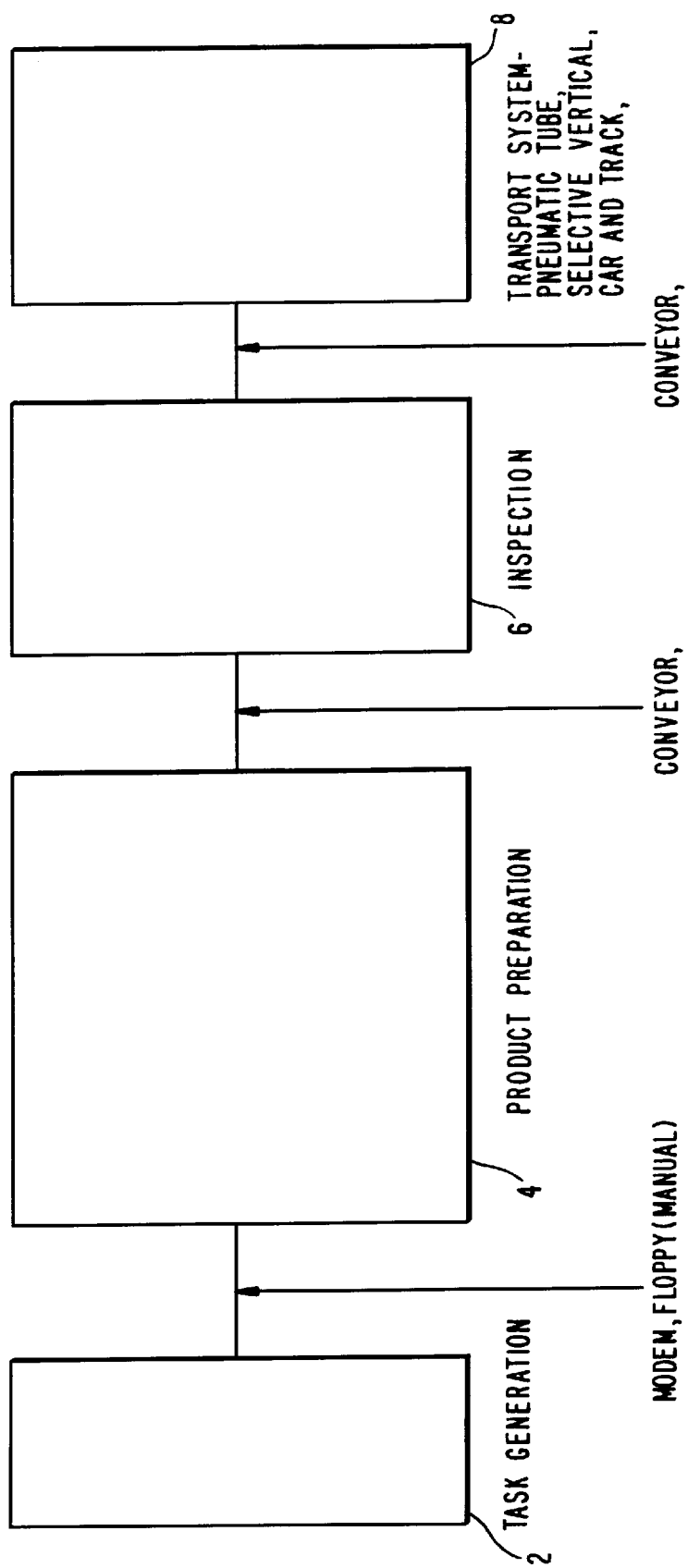
FIG. 1 shows functional block diagram of the present invention.

Referring now to FIG. 1, an overview of the present invention is demonstrated in a functional block diagram. It shows input queue step 2 (or task generation step), product preparation step 4, inspection step 6, and automatic distribution and receiving step 8.

Figure 2:
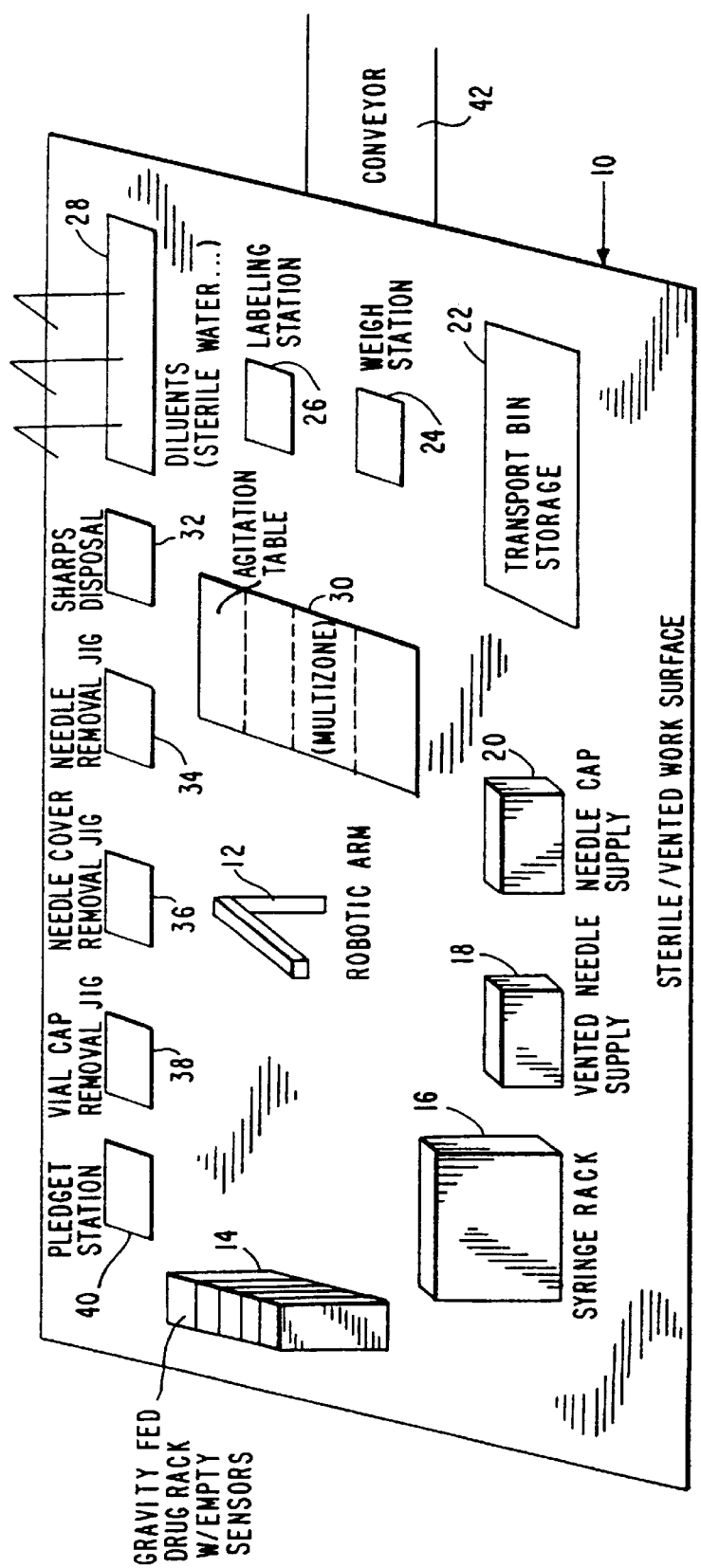
FIG. 2 shows a perspective diagrammatic representation of a selection, reconstitution, and dispensing apparatus.

Beginning with the product preparation step shown in FIG. 2, the present invention comprises a base 10 having thereon an industrial robot 12 which performs a series of manipulations resulting in the preparation of a single oral/solid or intravenous product unit based upon the information provided by the Pharmacy Information System. The robot 12 may have articulated arms, and gripping means in the form of jaw members having respective depending tangs at a rotatable wrist element of the arm.

Robot 12 may be arranged to present the jaw members at a number of stations including: gravity fed drug rack 14, syringe rack 16, needle supply rack 18, pledget station 40, vial cap removal jig 38, needle cover removal jig 36, needle removal jig 34, diluents rack 28, multi-zone agitation table 30, labeling station 26, weigh station 24, waste outlet 32, and transport bin storage 22.

The drug specified is retrieved by robotics arm 12 from gravity feed rack 14. A sensor located at the end of each column of the drug storage rack will detect an empty rack and notify the operation system that the column needs to be replenished.

With respect to oral/solid drugs, upon retrieval of the correct drug vial by the robotics arm 12, the protective cap is removed at removal jig 38 by inserting the vial into a removal jig 38 and snapping off the protective cap. The robotics arm 12 then brings the vial to another station where the appropriate dosage of oral/solid drug can be determined, for example, at weigh station 24, etc. Such dosage is removed from the vial via the robotic arm and placed into a delivery container. The delivery container is then put in a transport bin selected from transport bin storage 22. The bin with the product is then placed onto conveyor 42 which sends it to the inspection area.

With respect to parenteral products, upon retrieval of the correct drug vial by the robotics arm 12, the protective cap is removed, and the exposed rubber stopper of the vial is swabbed on an alcohol impregnated cotton pledget station 40. The pledget remains moist with isopropyl alcohol due to a wicking action.

After cleaning the stopper with alcohol, robot 12 sets the vial down, retrieves a standard 20 cc syringe with needle attached from syringe rack 16, and removes the protective needle cover by inserting it in needle cover removal jig 36 and pulling straight up. This action exposes the needle, and the protective cap is discarded.

Next, robot 12 inserts the needle into the injection port of a bag of Sterile Water for Injection from diluents rack 28. After insertion of the needle, the plunger on the syringe is extracted to the 20 cc mark, drawing in 20 cc of water into the syringe.

The syringe and needle containing the 20 cc is extracted from the Sterile Water for Injection bag on diluents rack 28. The regular needle is discarded in Sharps Waste Container 32 and a vented needle is retrieved from vented needle rack 18 and placed on the end of the syringe. The syringe is inverted and inserted into the selected vial of drug. The plunger is depressed, expelling the 20 cc of Sterile Water for Injection into the drug vial. The syringe and vented needle are removed, and the vial containing the diluent and drug are placed on agitation table 30 for sixty seconds.

Robot 12 proceeds to start on the next product while waiting for the current drug to complete the agitation step. Agitation table 30 is divided into zones relating to the zones in the automated pneumatic tube system.

Upon completion of agitation, the drug is removed from its zone of agitation table 30 and placed upon a compounding counter. The robot 12 then retrieves the appropriate syringe from syringe rack 16 and vented needle from vented needle rack 18, inserts vented needle into syringe, and inserts the syringe with needle into the vial of the drug in solution. The complete, attached system of drug vial, syringe and needle is inverted, with the drug uppermost and the syringe pointed upward. The plunger is retracted, withdrawing the entire contents of the drug vial back into the syringe. The syringe and vented needle are removed from the empty drug vial, and the empty vial is placed in a transport bin retrieved from transport bin storage 22, which is then fed to a staging location adjacent to conveyor 42.

The vented needle is removed from the syringe while in an upright position. This needle is placed in Sharps Waste Container 32. The syringe is inverted and a syringe tip cap is placed on the end of the syringe. The syringe with the reconstituted drug is labeled by rolling it over labeling station 26.

The labeled syringe with the reconstituted drug is placed on weigh station 24 and weighed to assure that the prepared unit meets anticipated specifications for weight, assuring that all diluent was added, and all drug extracted into the syringe. If accepted, the drug is placed in the same transport bin as the empty drug vial, and the transport bin is slid onto conveyor 42 which transports the product to the inspection station.

Figure 3:
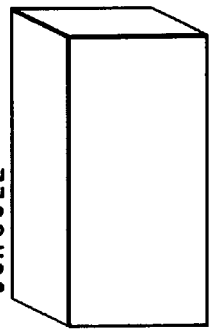
FIG. 3 shows a perspective diagram of an inspection station.
Figure 3:
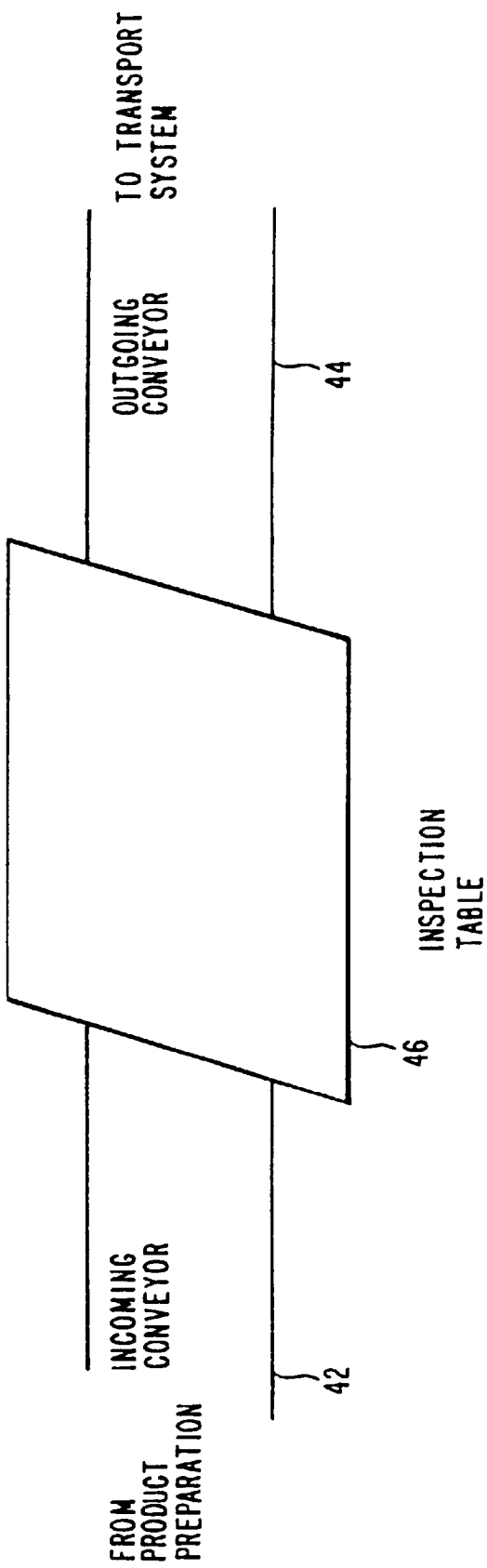

Now turning to FIG. 3, the inspection station is shown which can be either manual (i.e., by a highly skilled person) or automatic (i.e., barcode scanning, gas chromatography, and/or specific gravity measuring), where the product is sent after the appropriate drug is prepared, either oral/solid or parenteral. FIG. 3 shows incoming conveyor 42, inspection table 46, and outgoing conveyor 44. The product enters the inspection station via conveyor 42, wherein product is stopped on inspection table 46 to be either manually or automatically inspected. If approved, the product is placed in a transport bin which is placed on conveyor 44 leading to the loading dock of the automatic distribution station.

Figure 4A:
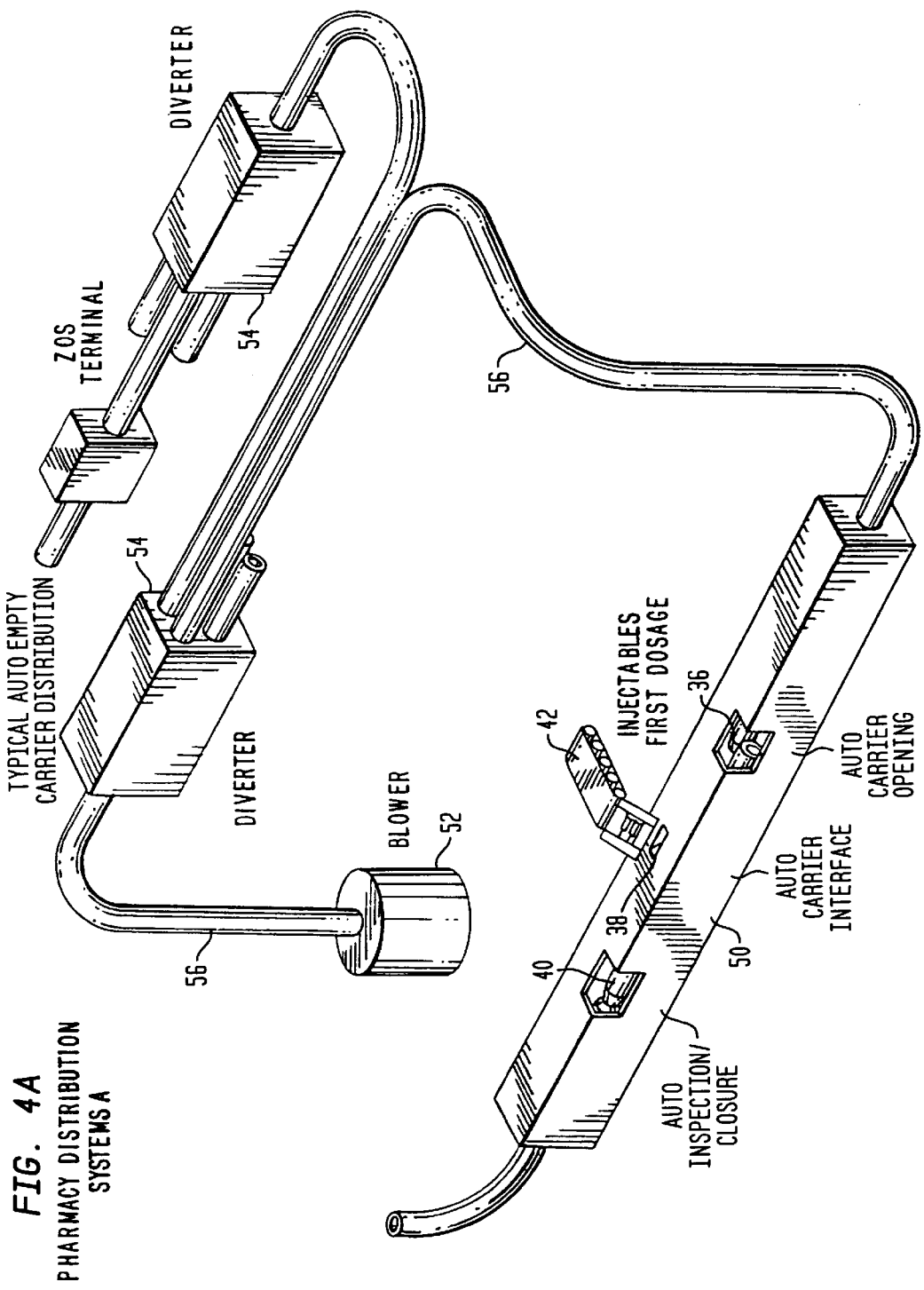
FIG. 4A shows a perspective diagrammatic representation of an automatic distribution system for injectable products.

FIG. 4A shows a preferred embodiment of the automatic accepting, loading, inspecting and distributing station according to the present invention where parenteral or injectable products are automatically loaded into pneumatic tube carrier and sent to their destinations through the pneumatic tube system. As shown, a preferred embodiment for the system of the present invention comprises: blower 52, diverters 54, conventional tubing 56 and AutoAcceptorTube 50. Conveyor 42 transports the products to AutoAcceptorTube 50 according to the present invention and then automatically loads the products into the carrier. Another embodiment may include robot system 43 (sown in FIG. 5A) to load the products into the carrier.

As depicted in FIG. 4A, a preferred embodiment of AutoAcceptorTube 50, the automated system of the invention, comprises carrier opening stage 36, carrier loading stage 38, inspection/closure stage 40 and conveyor 42. The empty carrier first enters opening stage 36, after being transported from an empty carrier storage and distribution system. The carrier is then opened by an automatic opening means in opening stage 36, while at the same time may be manually or automatically inspected for any defects or other problems. Also, the carrier may be barcoded in this stage and labeled with pertinent information, such as time, date, destination, system user, contents, patient, etc. Next, the carrier is moved to loading stage 38 where the appropriate product is automatically placed into the carrier, either via conveyor 42 or robot (not shown).

Figure 4C:
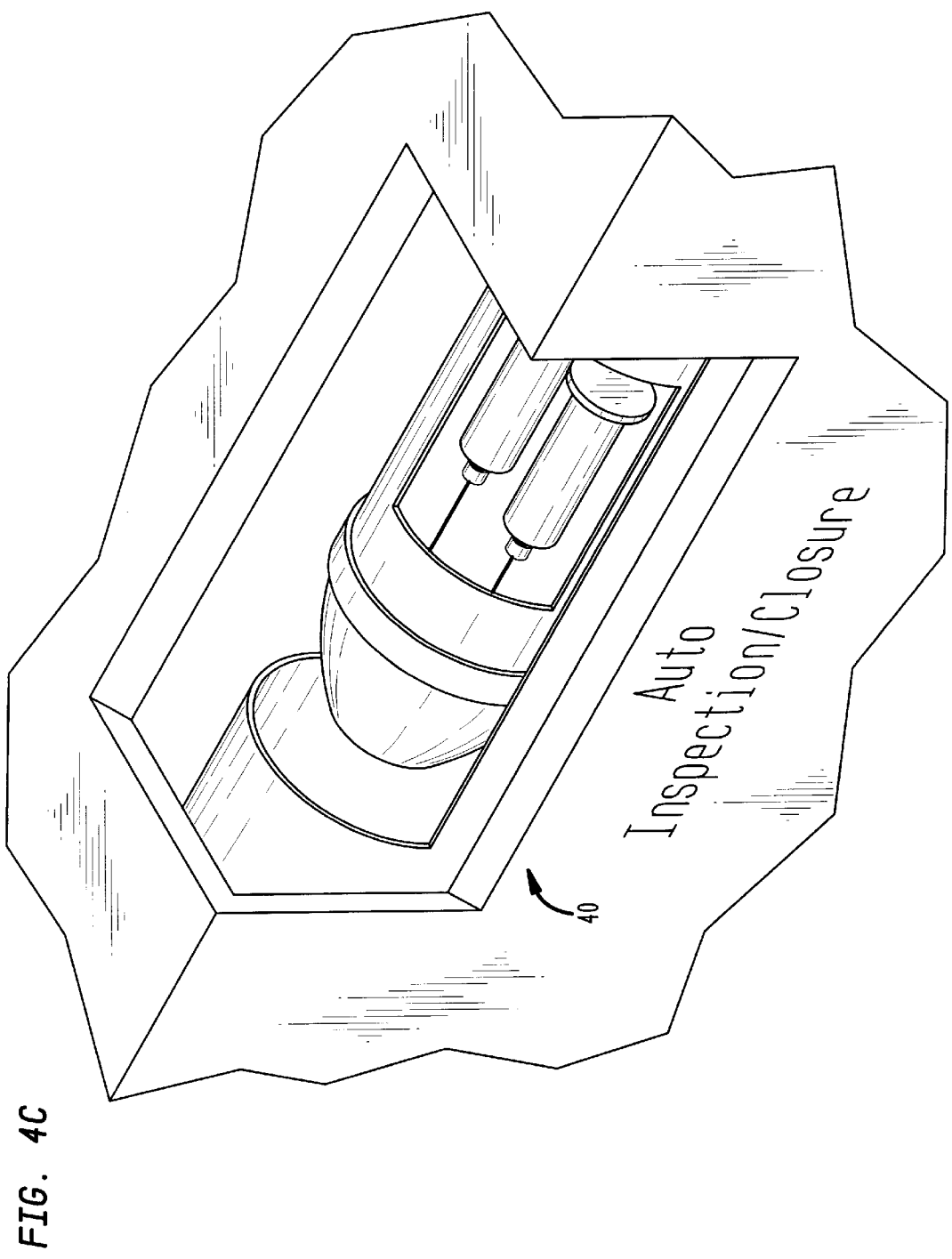
FIG. 4C shows an enhanced perspective diagrammatic representation of the auto inspection/closure stage of the automatic distribution system of FIGS. 4A and 4B.

While the carrier is in opening stage 36, the product is transported to the carrier via incoming conveyor 42 from the product production and inspection stations (shown in FIGS. 2 & 3). In one embodiment, the product enters the carrier through an opening in the top of the system at shown at carrier loading station 38. Once the product is loaded into the carrier, the carrier, along with the product, is moved automatically to the inspection/closing stage 40, the final stage prior to being sent to the pneumatic tube system (see FIG. 4C for an enhanced view of inspection/closing stage 40). Here the product and carrier are inspected, either automatically or manually, and if approved, the carrier is closed securely by an automatic closing mechanism and moved to the pneumatic tube system for delivery to its destination.

Shown in FIG. 4B is a transparent view of the automated distribution system of FIG. 4A, showing its internal structure. Depicted is conventional tubing 56 for a typical pneumatic tube system connected to each end of AutoAcceptorTube 50, which appears as a "box". Inside AutoAcceptorTube 50 or the "box", prior to opening stage 36, conventional tubing 56 ends, thereby providing access to the carrier. The carrier is then moved through the three stages via a conveyor-like mechanism inside AutoAcceptorTube 50 where it enters the process described above. At the end of inspection/closing stage 40 conventional tubing 56 begins again, and the closed carrier can be delivered to its destination through the typical pneumatic tube system.

Figure 5C:
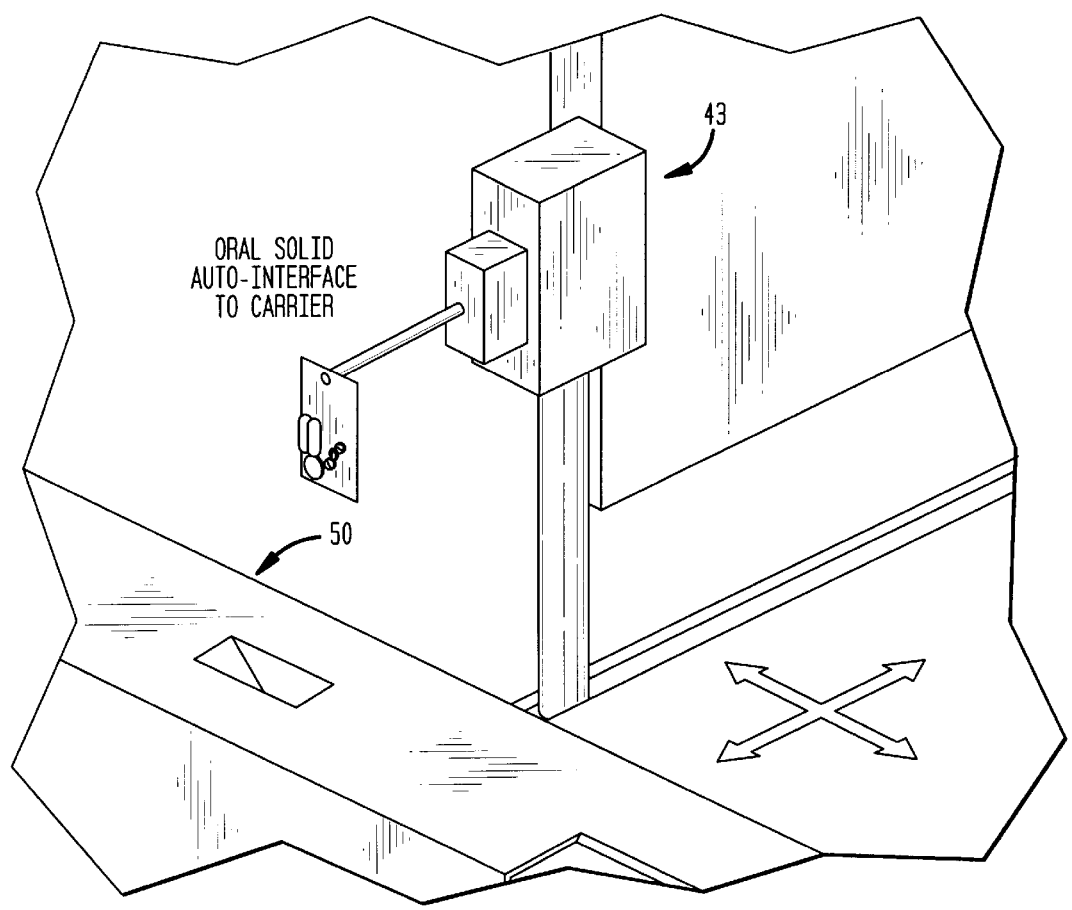
FIG. 5C shows an enhanced perspective diagrammatic representation of the automated oral/solid distributor shown in FIGS. 5A and 5B for an automated pharmacy distribution system.
Figure 5D:
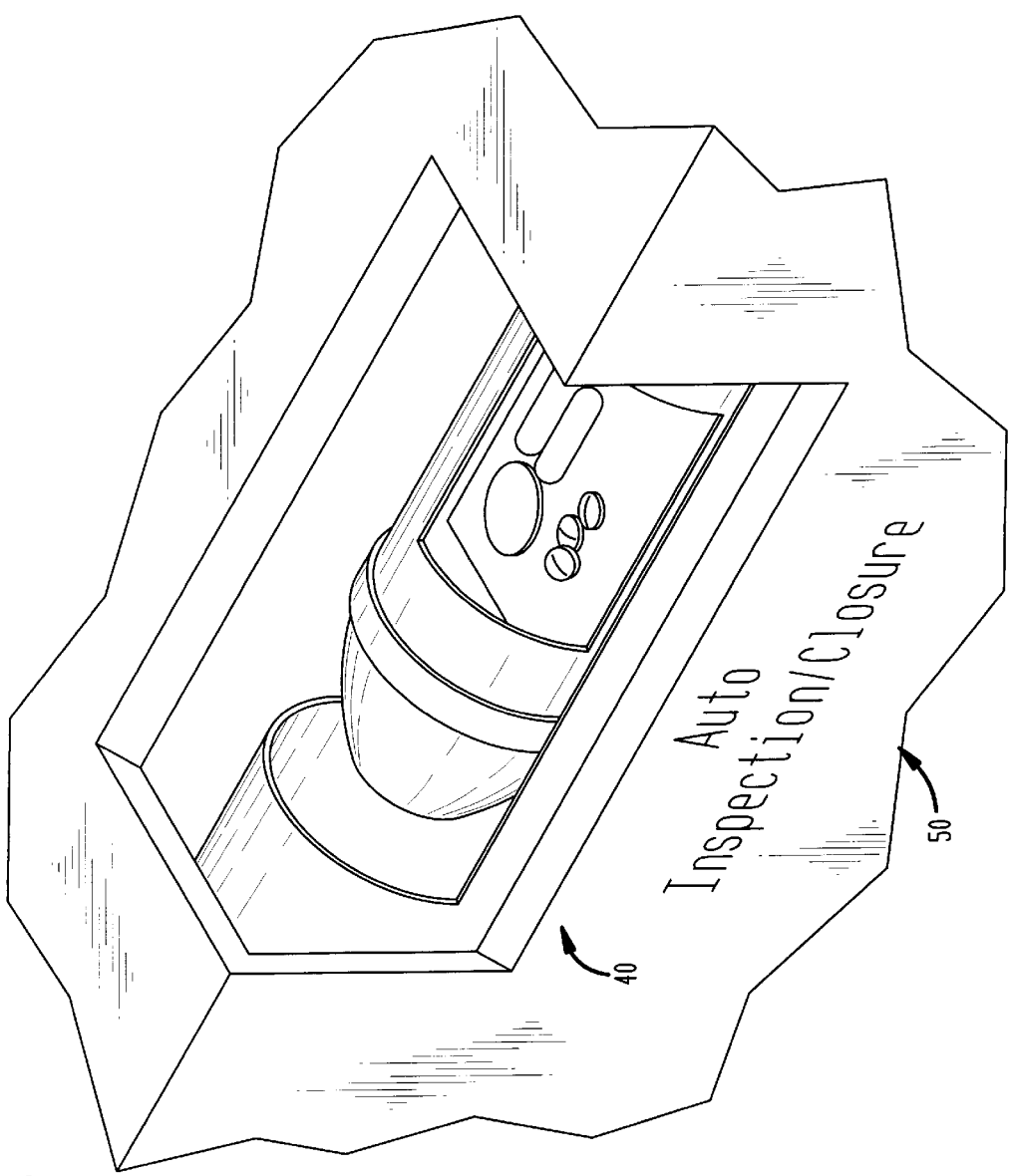
FIG. 5D shows an enhanced perspective diagrammatic representation of the auto inspection/closure stage of the automatic distribution system of FIGS. 5A and 5B.

Like FIG. 4A, FIG. 5A shows another embodiment of AutoAcceptorTube 50 for the automatic accepting, loading, inspecting and distributing of oral/solid products to be loaded into a conventional pneumatic tube carrier and sent to their destinations through a conventional pneumatic tube system. Similarly, FIG. 5A shows an automated system comprising carrier opening stage 36, carrier loading stage 38, inspection/closure stage 40 and robot system 43. The empty carrier first enters opening stage 36, after being retrieved from the empty carrier storage and distribution system, and then is automatically opened. The carrier is then moved to loading stage 38 where the appropriate oral/solid product is automatically placed into the carrier by robot system 43. The oral/solid product is brought to the carrier via robot system 43 (an enhancement of robot system 43 is shown in FIG. 5C) which selects the appropriate oral/solid product from product storage station 44. Robot system 43 then inserts the oral/solid product into the carrier through an opening in the top of the system. Once the product is loaded into the carrier, the carrier is moved to the third stage where both the product and carrier are inspected (see FIG. 5D for an enhanced view of inspection/closing stage 40). If approved, the carrier is automatically closed securely by a closing mechanism and sent into the pneumatic tube system where it is delivered to the proper location.

Like FIG. 4B, FIG. 5B shows a transparent view of the automated distribution system of FIG. 5A, showing its internal structure. Depicted is conventional tubing 56 for a typical pneumatic tube system connected to each end of AutoAcceptorTube 50, which appears as a "box". Inside AutoAcceptorTube 50 or the "box", prior to opening stage 36, conventional tubing 56 ends, thereby providing access to the carrier. The carrier is then moved through the three stages via a conveyor-like mechanism where it enters the process described above. At the end of inspection/closing stage 40 conventional tubing 56 begins again, and the closed carrier can be delivered to its destination through the typical pneumatic tube system.

A preferred carrier for use with the present invention is shown in FIG. 6. Shown is carrier 60 consisting of first and second shells 62, 62' which extend longitudinally and which are interconnected by hinges 64 and rod locking members 68. Members 68 lock the rod in place, so that hinges 64 can provide for the opening and closing of the carrier 60 halves 62 and 62'. The carrier 60 halves 62 and 62' are formed of plastic, for example, and raised areas are formed along the exterior surface, around the transverse perimeter of the carrier, as shown as glide or travel or accelerator rings 66. Two accelerator or glide or travel rings 66 are use for each carrier 60, and may consist of Velcro® secured plastic or rubber strips. A suitable felt material or Neoprene® material may also be used to make the seals 66, which may also be cut from a sheet of the material such that moisture will tend to cause dimension changes substantially in the direction longitudinal with respect to the carrier, rather than radially. The seals 66 may be adhesively attached to the shells 62 and 62' at respective raised portions. The purpose of the rings 66 is so that carrier 60 forms a tight, consistent and secure fit within the interior of the carrier tubes, so that the carrier 60 may travel effectively through the carrier tubes. As the carriers 60 often reach speeds in excess of 25 feet per second, the rings 66 serve to form an air barrier around the carrier 60, so that the carrier 60 does not jam. Also, by minimizing air leakage around the carrier, rings 66 can minimize the air required to propel carrier 60. Felt insert is provided, as well, so that the rings 66 appear as continuous concentric circles—and no air can escape the seal the rings 66 form in relation to the interior of the carrier tubes, even where the hinge assemblies 64 are concerned. Ends of the carrier are defined by respective resilient bumpers 72. Each of the bumpers 72 is preferably larger than half the diameter of the pneumatic tube to avoid possible jamming of one carrier 60 with a second carrier within the pneumatic tube. The shells 62 and 62' are substantially identical in shape and are preferably molded in the same or a similar mold form from a suitable plastic material such as LEXAN® (a trade mark for a polycarbonate plastic sold by GE Plastics). Because the shells 62 and 62' are substantially identical and can often be made from even the same mold, molding costs can be significantly reduced.

In order to simplify this description, parts of shell 62 will be described, but it should be understood that corresponding parts of shell 62' also may exist, as desired. The shell 62 is generally semi-cylindrical over the major portion of its length, with the exception, for example, of the raised portions under rings 66. Those raised portions may also correspond to internally concaved zones, which may contribute to the overall structural integrity of the carrier 60.

The portions of carrier 60 that support the seals 66 are positioned intermediate the ends of the carrier 60 at positions which maximize the available length and diameter dimensions of the carrier. The shells 62 and 62' further includes tapered or frusto-conical end portions 70.

Hinge assemblies 64 are preferably molded as a part of the shells 62 and 62' and the pivot points of the hinges 64 are offset from mating edges of the shells 62 and 62' to permit the ends of the rings 66 and shells 62 and 62' to securely mate together when closed, without damage to the seal halves 66. The hinges 64 are preferably located so that they will not contact the interior of the carrier tube walls. Although the carrier tube walls are often made of steel, and the carriers 60 are often made of plastic, it is generally desirable to have only smooth, continuous surfaces contacting the interior of the carrier tube walls. For example, if a metallic hinge 64 were to scratch the interior of the carrier tube wall, ruts could result, which will facilitate air seepage, and a loss of system efficiency, as air passes through said ruts.

Figure 7C:
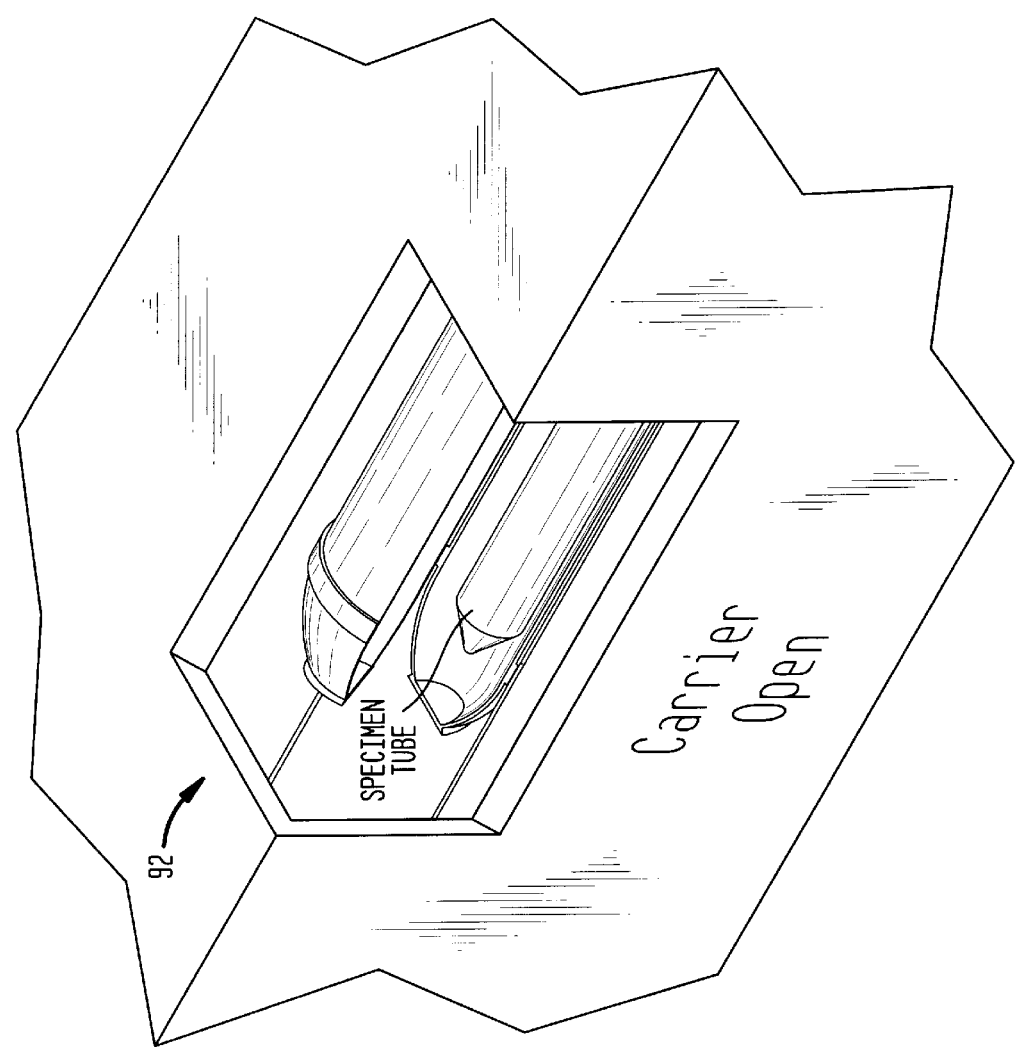
FIG. 7C shows an enhanced perspective diagrammatic representation of the carrier opening stage of the automated specimen receiving station of FIGS. 7A and 7B.

Referring now to FIGS. 7A, 7B & 7C, shown is yet another embodiment of the present invention for use an automatic receiving station. FIG. 7A shows AutoAcceptorTube 50 used as an automatic receiving station for receiving products sent in a carrier through a conventional pneumatic tube system. Like FIGS. 4A–B and 5A–B, FIGS. 7A–C show an automated system comprising three stages, carrier opening stage 92, carrier loading stage (here an unloading stage) 94, and carrier closing stage 96. The pneumatic tube carrier containing a product or products first enters opening stage 92 after being transported through the pneumatic tube system. At carrier opening stage 92, the carrier is automatically opened, while also being manually or automatically inspected for any defects or other problems. Via a conveyor-like device, the carrier is moved to carrier unloading stage 94 where the product or products are automatically removed from the carrier by a robot device. Once the product is removed from the carrier, the carrier is moved via the carrier-like device to carrier closing stage 96. Here, the carrier is inspected and automatically closed securely. The empty carrier is then sent back to the empty carrier storage piping (This is disclosed in a co-pending patent application).

Figure 9:
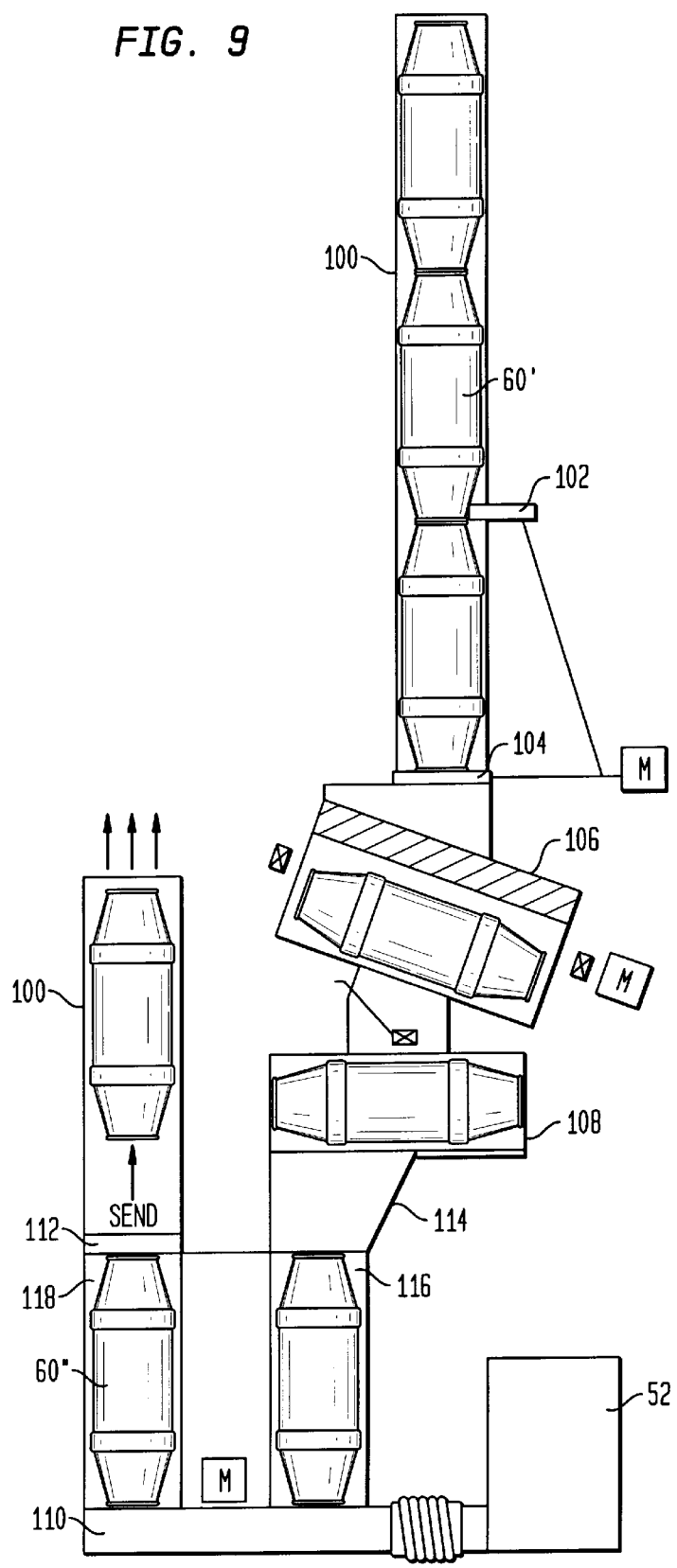
FIG. 9 shows a diagrammatic representation of a preferred embodiment of the automatic carrier handling system in accordance with the present invention.

Turning next to FIG. 9, shown is yet another alternate embodiment of the automatic carrier loading and distribution apparatus for use in conjunction with a pneumatic tube transport system according to the present invention. In this embodiment, carriers 60' are introduced to the automatic loading and distributing apparatus from an empty carrier storage piping via clear tubing 100. When a product is ready to be delivered, slidegate 104 opens thereby releasing the next available empty carrier 60' from clear tubing 100, while pin 102 keeps the remaining empty carriers 60' in clear tubing 100 from be released as well. When slidegate 104 closes, pin 102 opens thereby releasing empty carriers 60' such that the next empty carrier 60' is ready to be released by slidegate 104. Slidegate 104 then opens and the empty carrier 60' is released into tumbler 106. Tumbler 106 then rotates the carrier and feeds it into load cell 108. Load cell 108 is described in greater detail below in FIG. 10.

Figure 10:
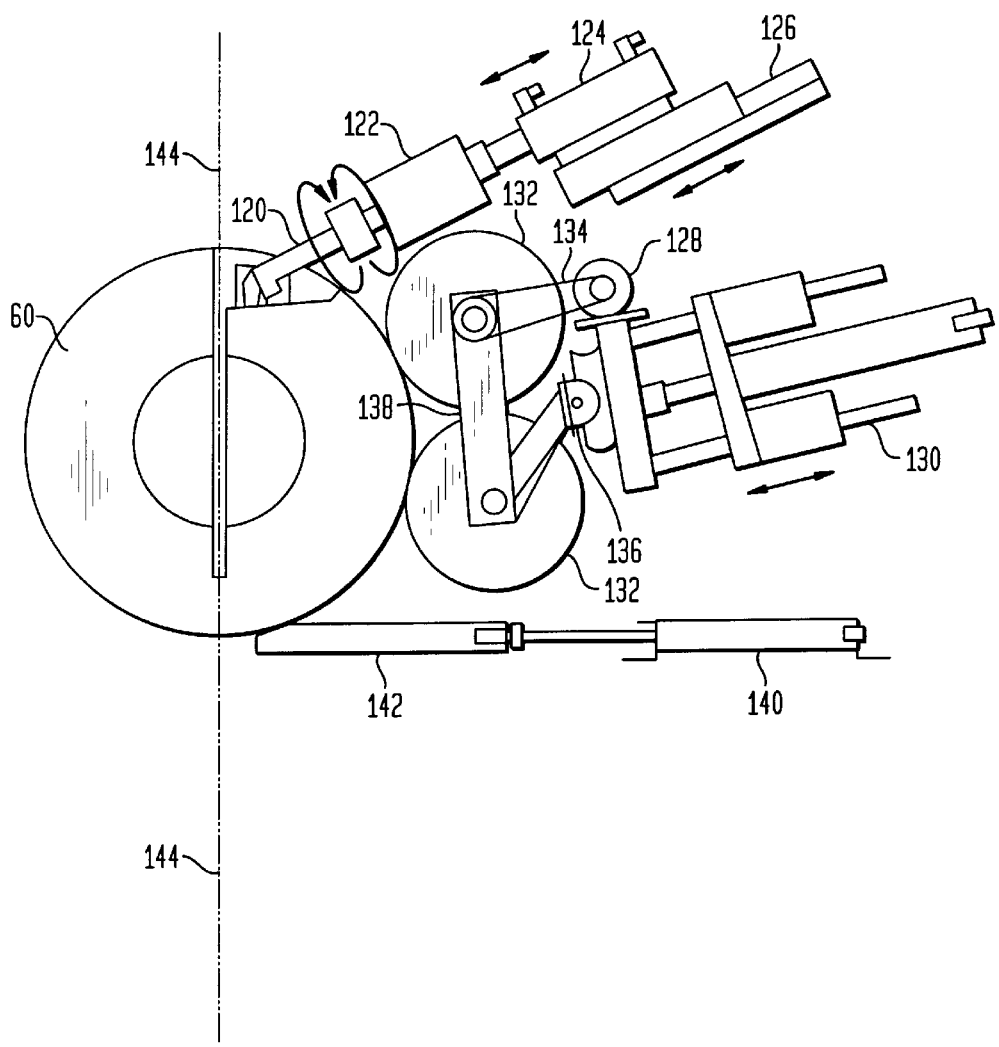
FIG. 10 shows a diagrammatic representation of a preferred embodiment of the automatic carrier opening mechanism in accordance with the present invention.

Turning next to FIG. 10, shown is carrier 60' in load cell 108 which comprises rotary actuator 122, drive rols 132, alignment means 144, drop door 142, and the necessary parts to control these essential elements (they are all described in more detail below). When carrier 60' is first accepted by load cell 108, iti may not be properly aligned for opening by rotary actuator 122. Therefore, carrier 60' is initially positioned parallel to a pair of drive rolls 132. Drive roll cylinder 130 then moves drive rolls 132 toward carrier 60' until both drive rols 132 are adjacent to (i.e., actually touching) carrier 60'. Pivot 136 allows drive rolls 132 to pivot against drive roll cylinder 130, thereby allowing both drive rolls 132 to sit in contact with carrier 60'.

Once, carrier 60' is situated adjacent to drive rolls 132, drive motor 128 initiates rotation of drive belt 134 which in turn rotates oth drive rolls 132. As drive rolls 132 spin, carrier 60' rotates while remaining in load cell 108. An alignment means 144 (such as photo eyes) detects when carrier 60' is positioned correctly for opening by rotary actuator 122 (i.e., alignment means 144 may detect when carrier 60' is positioned with latch hooks 120 in a particular position). As soon as this proper position is detected, instructions are transmitted to the drive motor 128 to stop rotating carrier 60'. However, drive roll cylinder 130 remains in position with drive rolls 132 firmly against carrier 60' in order to hold carrier 60' in place while being opened by rotary actuator 122.

A preferred embodiment of latch hook 120 opening means according to the present invention comprises at least the following: slide cylinder 126; double rod cylinder 124 and rotary actuator 122. Once the system detects, via alignment means 144, that latch hooks 120 are properly positioned for opening, the system instructs the opening means to procedd to disengage latch hooks 120. First, slide cylinder 126 moves double rod cylinder 124 and rotary actuator 122 toward latch hooks 120 until rotary actuator 122 contacts latch hooks 120. Second, double rod cylinder 124 initiates the rotation of rotary actuator 122 such that the tip of rotary actuator 122 disengages latch hooks 120 by rotating underneath each latch hook 120 as shown in FIG. 10.

Now that carrier 60' is in the open position, the product to be transported may be automatically deposited (i.e., via robot, etc.) into carrier 60'. Once the product is loaded, carrier 60' is automatically closed, barcoded and locked. After completion of the loading in load cell 108, drop door 142 is removed from underneath carrier 60' by drop cylinder 140. Turning back to FIG. 9, carrier 60' is then dropped into standing position 116 and moved into position 118 for delivery into the pneumatic tube system. Once carrier 60' is in position 118 along with the removal of pin 112, blower 52 produces sufficient air flow through air plenum 110 to force carrier 60' into tubing 100 of the pneumatic tube system. Carrier 60' containing the loaded product is then on its way to its destination.

Figure 11B:
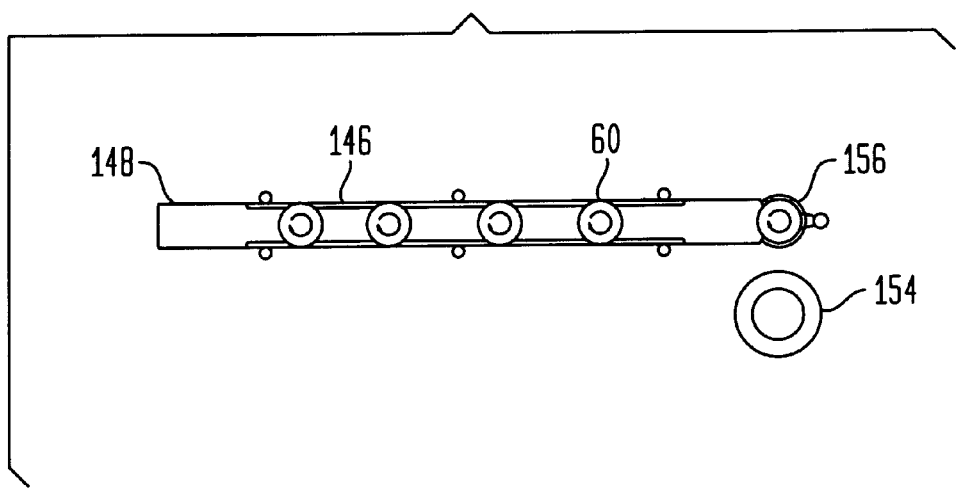
FIG. 11B shows a top view of the automatic dispatching apparatus in FIG. 11A.
Figure 11C:
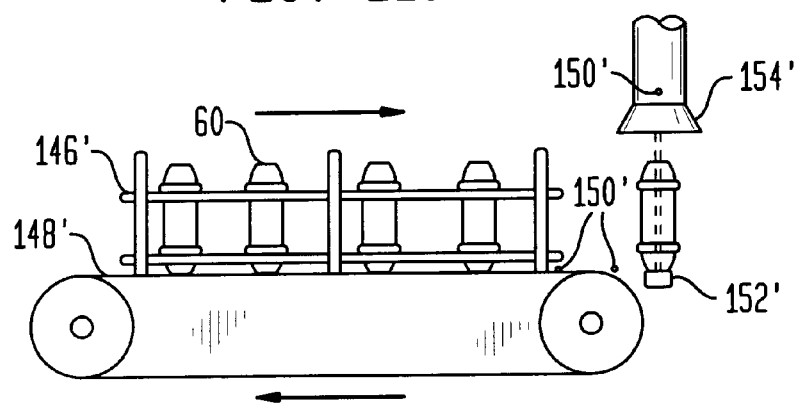
FIG. 11C shows a side view of an alternate embodiment of the automatic dispatching apparatus (i.e., up-send carrier dispatch) of FIGS. 11A & 11B.

Turning next to FIGS. 11A–11C, shown is yet another embodiment of the present invention. FIGS. 11A & 11B show a down-send dispatch embodiment of the automatic dispatching apparatus according to the present invention, while FIG. 11C shows an up-send automatic dispatching apparatus. With both dispatching systems, the empty carrier retrieval unit 166 contains carriers 60 which have been inspected and are ready for loading. First, slidegate 162 opens so that the first carrier 60 drops out of carrier retrieval unit 166 into receiving chute 160. Pin 164 firmly holds the remaining carriers within carrier retrieval unit 166 until slidegate 162 closes, at which point pin 164 opens thereby releasing the next carrier 60 to slidegate 162.

Once carrier 60 reaches the end of receiving chute 160, an operator then manually opens carrier 60, using either the side or top opening mechanism, and manually loads carrier 60 with the product to be delivered. The operator then manually places the loaded carrier 60 onto conveyor 148. The operator may continue loading conveyor 148 until it is full. As conveyor 148 moves, loaded carriers 60 are brought to the automatic down-send dispatch mechanism. While on conveyor 148, carriers 60 are prevented from falling of by side rails 146. Once at the automatic down-send dispatch mechanism, sensors 150 detect the presence of a loaded carrier 60, which then trigger conveyor 148 to stop and trigger clamp 156 to rotate into position to receive carrier 60.

When carrier 60 reaches clamp 156, clamp closes around carrier 60 and rotates with carrier 60 to position carrier 60 directly above bell mouth 154 of the pneumatic tubing which leads to the overall pneumatic tube system. Once carrier 60 is released by clamp 156 into bell mouth 154, clamp 156 rotates back to conveyor 148 to receive another carrier 60, and conveyor 148 starts again in order to deliver the next carrier 60 to clamp 156. FIG. 11B merely shows a top view of the down-send dispatch conveyor 148 containing carriers 60 and side rails 146 leading to clamp 156 and bell mouth 154.

Alternatively, an up-send dispatch apparatus as shown in FIG. 11C could be employed. In such an up-send dispatch apparatus, carrier 60 is retrieved, loaded, and brought to the dispatch mechanism in the same manner as described above for the down-send apparatus. However, once carrier 60 on conveyor 148' reaches the end of conveyor 148' and is detected by sensors 150', conveyor 148' stops and line actuator or air cylinder 152' receive carrier 60 and force it upward into bell mouth 154'. In the up-send dispatch apparatus, there is no clamp used in transporting carrier 60 from conveyor 148' to bell mouth 154' as with the down-send dispatch described above. Again, once carrier 60 is loaded into bell mouth 154', line actuator or air cylinder 152' returns to its strating point to receive another carrier 60. Conveyor 148' starts again which moves the next carrier 60 into line actuator or air cylinder 152' and the process begins again.

Figure 12:
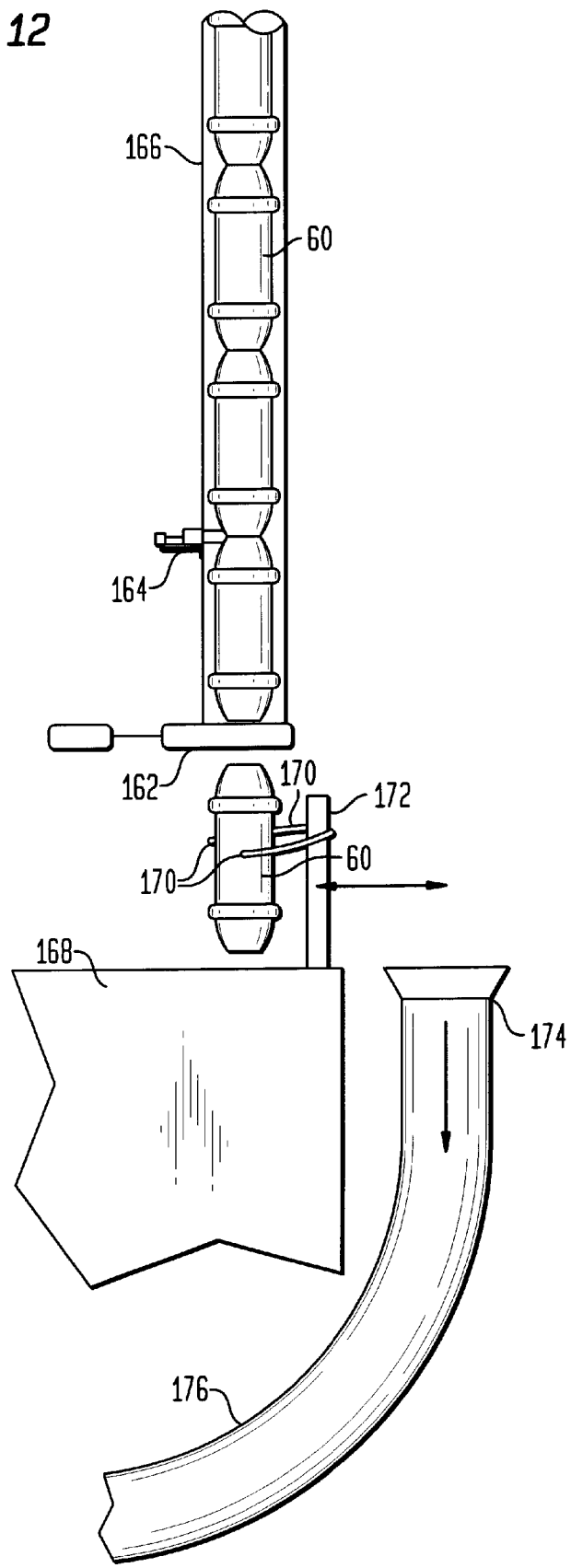
FIG. 12 shows an end view of a down-send dispatch apparatus, demonstrating the automated clamping apparatus for automatically recieving carriers and loading them into a pneumatic tube system.

Next, FIG. 12 shows an end view of a down-send dispatch apparatus, demonstrating the automatic clamping apparatus for automatically recieving carriers and loading them into a pneumatic tube system. Carriers 60 are again contained in empty carrier retrieval unit 166 until slidegate 162 opens. When slidegate 162 opens, pin 164 remains in place, holding the remaining carriers 60 inside carrier retrieval unit 166 so that only one carrier is processed at a time. Carrier 60 then drops into open clamp 170 at which point clamp 170 closes and rotates on axis 172 to a position directly above bell mouth 174. Carrier 60 is then released by clamp 170 and dropped into bell mouth 174 for transportation to its destination through a pneumatic tube system. Clamp 170 then returns to its starting position under slidegate 162 where it awaits another carrier 60. This process is then repeated.

Figure 8:
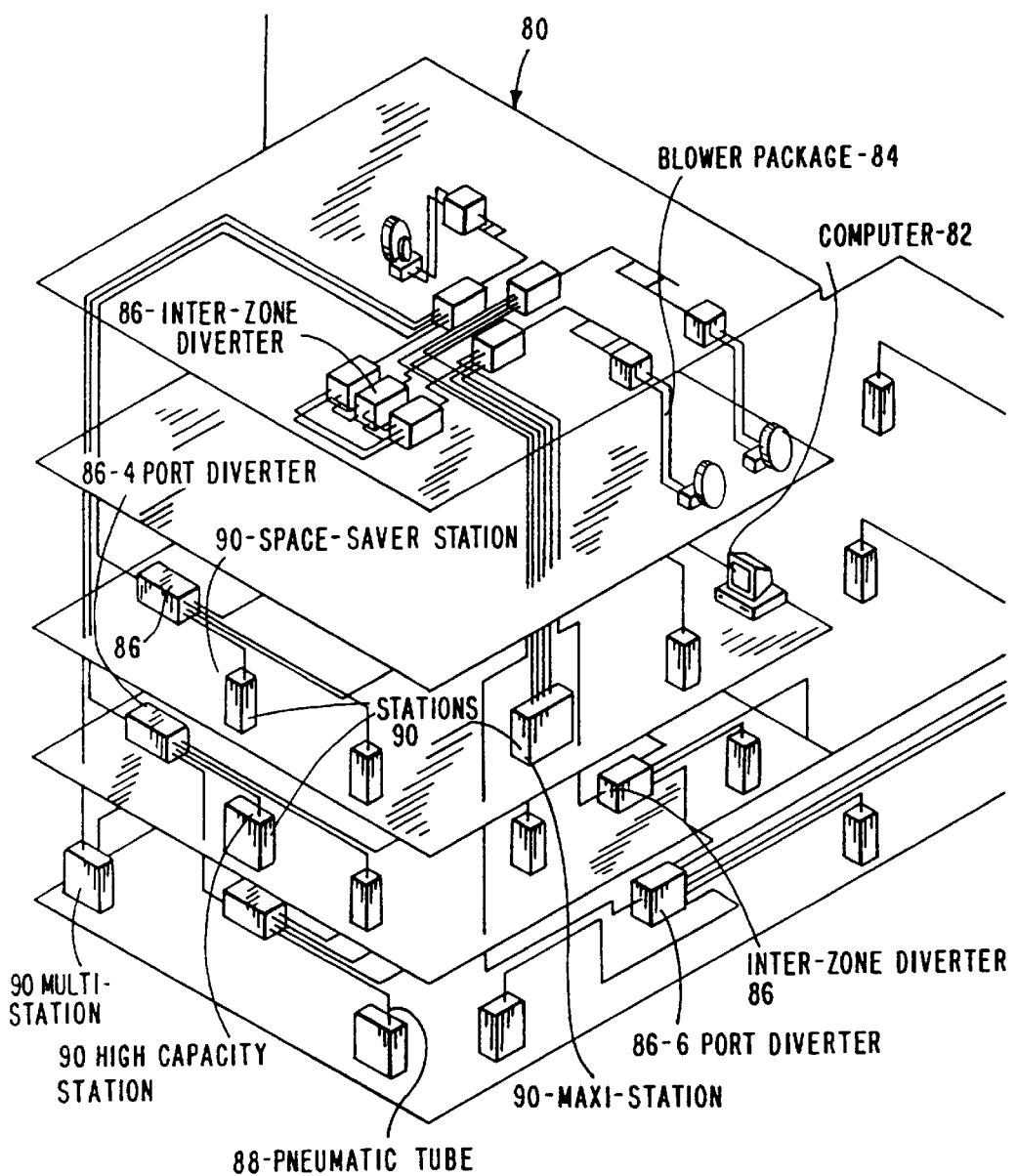
FIG. 8 is a perspective diagrammatic representation of a multi-zone pneumatic tube system.

The present invention is described above for use with an automated pneumatic tube system. Such an automated pneumatic tube system is shown in FIG. 8. FIG. 8 shows a three-zone system comprising one blower package 84 per zone, pneumatic tubes 88, inter-zone diverters 86, computer 82, and receiving stations 90, all connected via single transmission tubing. Carriers move through the system shown in FIG. 8 under vacuum or pressure as supplied by blower package 84. As the carriers move through the system, the diverters 86 change position to change the direction of the carrier. Also, diverters 86 make inter-zone communications possible.

Although FIG. 8 demonstrates a three zone system with a limited number of receiving stations 90, a system with numerous zones and virtually unlimited stations 90 is possible.

It will be appreciated that although the above description is limited to a system for use in a hospital pharmacy, the invention is applicable for other similar purposes. For instance, the invention may be used with dietaries, laboratories, central supply areas, etc. While the foregoing embodiments of the invention have been set forth in considerable detail for the purposes of making a complete disclosure of the invention, it will be apparent to those skilled in the art that numerous changes may be made in such details without departing from the spirit and the principles of the invention.

What is claimed is:

1. An apparatus for automatically coupling, labeling and loading products into pneumatic tube carriers and distributing said carriers via a pneumatic tube carrier system, wherein said apparatus comprises:
- at least one computer having a database, wherein said computer is capable of receiving information and transmitting said information;
- means for opening said carriers;
- means for inserting said products into said carriers, said means for inserting comprising at least one robot device, having at least one movable arm, at least one means for coupling products, and at least one means for labeling said carriers;
- means for closing said carriers; and
- means for moving said carriers between said means for opening, said means for inserting, and said means for closing;
- wherein said computer instructs said pneumatic tube carrier system to deliver an empty one of said carriers to said means for opening;
- wherein said means for opening receives and opens said carriers;
- wherein said means for inserting retrieves and inserts said products into said carrier;
- wherein said means for coupling is attached to at least one said movable arm and has sensors which indicate the presence or absence of said products;
- wherein said carriers are closed by said means for closing; and
- wherein said carriers are transported from said means for closing to said pneumatic tube carrier system for distribution to a predetermined destination.

2. An apparatus for automatically coupling, labeling and loading products into pneumatic tube carriers and distributing said carriers via a pneumatic tube carrier system, wherein said apparatus comprises:
- at least one computer having a database, wherein said computer is capable of receiving information and transmitting said information;
- means for opening said carriers comprising:
  - a drive motor;
  - a rotary motor;
  - at least one rotary actuator for unlatching said carriers;
  - at least one drive roll for aligning said carriers such that said carriers are aligned with said rotary actuator for said unlatching; and
  - means for verifying said aligning;
- means for inserting said products into said carriers;
- means for closing said carriers; and
- means for moving said carriers between said means for opening, said means for inserting, and said means for closing;
- wherein said computer instructs said pneumatic tube carrier system to deliver an empty one of said carriers to said means for opening;
- wherein said means for opening receives and opens said carriers;
- wherein said drive motor controls each said drive roll and said rotary motor controls said rotary actuator;
- wherein said means for inserting retrieves and inserts said products into said carrier;
- wherein said carriers are closed by said means for closing; and
- wherein said carriers are transported from said means for closing to said pneumatic tube carrier system for distribution to a predetermined destination.

3. A system for automatically coupling, labeling and loading and distributing products to a predetermined destination via a pneumatic tube carrier system, wherein said apparatus comprises:
- at least one control means;
- a plurality of pneumatic tube carriers;
- a conveyor;
- a carrier opening device, comprising a drive motor, a rotary motor, at least one rotary actuator for unlatching said carriers, at least one drive roll for positioning said carrier such that said carriers are aligned with said rotary actuator, and an alignment means for verifying said positioning;
- a product transfer device; and
- a carrier closing device;
- wherein said carrier opening device inspects and opens said carriers;
- wherein said drive motor controls each said drive roll and wherein said rotary motor controls said rotary actuator;
- wherein said product transfer device retrieves said products and inserts said product into said carriers; and
- wherein said carrier closing device inspects and closes said carriers.

4. A method for the automatic distribution of a product through a pneumatic tube delivery system, said method comprising the steps of:
- inputting information into a control means;
- transmitting said information from said control means to a product transfer device and said pneumatic tube delivery system;
- opening a pneumatic tube carrier;
- selecting said product in accordance with said information;
- inserting said product into said carrier;
- closing said carrier; and
- transporting said carrier through said pneumatic tube system in accordance with said information;
- wherein said computer controls said selecting, said inserting, said opening, said closing and said transporting in accordance with said information;
- wherein a carrier handling means performs said opening and said closing, said carrier handling means comprising a drive motor, a rotary motor, at least one rotary actuator for unlatching said carrier, at least one drive roll for aligning said carrier such that said carrier is aligned with said rotary actuator, and means for verifying said aligning;
- wherein said drive motor controls each said drive roll and said rotary motor controls said rotary actuator; and
- wherein said product transfer device performs said selecting and said inserting.

* * * * *